(12) United States Patent
Kusakari

(10) Patent No.: US 9,397,709 B2
(45) Date of Patent: *Jul. 19, 2016

(54) LIGHT DEVICE AND POSITIONAL INFORMATION MANAGEMENT SYSTEM

(71) Applicant: Shin Kusakari, Kanagawa (JP)

(72) Inventor: Shin Kusakari, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 238 days.

This patent is subject to a terminal disclaimer.

(21) Appl. No.: 13/908,117

(22) Filed: Jun. 3, 2013

(65) Prior Publication Data

US 2013/0331038 A1 Dec. 12, 2013

(30) Foreign Application Priority Data

Jun. 12, 2012 (JP) .................. 2012-133277
Apr. 9, 2013 (JP) .................. 2013-081083

(51) Int. Cl.
| | | |
|---|---|---|
| *H04W 24/00* | (2009.01) | |
| *H04B 7/00* | (2006.01) | |
| *H04B 1/03* | (2006.01) | |
| *G01S 5/00* | (2006.01) | |
| *G01S 5/02* | (2010.01) | |
| *G01S 5/14* | (2006.01) | |
| *H05B 33/08* | (2006.01) | |
| *F21V 33/00* | (2006.01) | |
| *F21K 99/00* | (2016.01) | |
| *F21Y 101/02* | (2006.01) | |
| *H05B 37/02* | (2006.01) | |

(52) U.S. Cl.
CPC ... *H04B 1/03* (2013.01); *G01S 5/00* (2013.01); *G01S 5/02* (2013.01); *G01S 5/0263* (2013.01); *G01S 5/14* (2013.01); *H05B 33/0833* (2013.01); *F21K 9/17* (2013.01); *F21V 33/00* (2013.01); *F21Y 2101/02* (2013.01); *H05B 37/0272* (2013.01)

(58) Field of Classification Search
CPC ........ H04B 1/3827; H04B 5/02; H04B 10/40; H04B 10/1143; H04W 64/00; H04W 88/02
USPC ........ 455/66.1, 456.1, 556.1, 557; 340/539.1, 340/539.11

See application file for complete search history.

(56) References Cited

U.S. PATENT DOCUMENTS

| | | | |
|---|---|---|---|
| 8,280,398 B2 | 10/2012 | Ishii et al. | |
| 8,653,984 B2 * | 2/2014 | Ivey et al. | 340/815.4 |
| 8,812,260 B2 * | 8/2014 | Yuen et al. | 702/160 |
| 8,902,076 B2 * | 12/2014 | Pederson et al. | 340/815.45 |
| 9,172,405 B2 * | 10/2015 | Kusakari | H04B 1/03 |
| 2013/0234893 A1 * | 9/2013 | Kusakari et al. | 342/386 |
| 2013/0244697 A1 * | 9/2013 | Kusakari et al. | 455/456.2 |
| 2013/0328481 A1 * | 12/2013 | Hiroi | H05B 37/0272 315/34 |
| 2013/0329423 A1 * | 12/2013 | Kusakari | F21V 33/00 362/234 |
| 2013/0330085 A1 * | 12/2013 | Kusakari | H04B 10/25758 398/115 |
| 2013/0331037 A1 * | 12/2013 | Kusakari | H04B 1/03 455/66.1 |
| 2014/0233226 A1 * | 8/2014 | Wallace et al. | 362/221 |

FOREIGN PATENT DOCUMENTS

| | | |
|---|---|---|
| JP | 2005-158007 | 6/2005 |
| WO | 2005/086375 A1 | 9/2005 |

* cited by examiner

*Primary Examiner* — Quochien B Vuong
(74) *Attorney, Agent, or Firm* — Harness, Dickey & Pierce, P.L.C.

(57) ABSTRACT

A light device includes a light emitting module in which a plurality of light sources are provided; caps that are provided at two ends of the light emitting module and are to be mounted in a lighting fixture; and a positional information transmission part that is provided between an outermost one of the plurality of light sources of the light emitting module and the corresponding cap and transmits predetermined positional information.

9 Claims, 21 Drawing Sheets

FIG.18

| FLOOR NUMBER | LATITUDE | LONGITUDE | BUILDING NUMBER |
|---|---|---|---|
| 16 | 35.459555 | 139.387110 | C |

FIG.19

| FLOOR NUMBER | LATITUDE | LONGITUDE | BUILDING NUMBER |
|---|---|---|---|
| 16 | 35.459555 | 139.387110 | C |

FIG.20

| FLOOR NUMBER: 9 BITS | LATITUDE: 21 BITS | LONGITUDE: 21 BITS | BUILDING NUMBER: 8 BITS |
|---|---|---|---|

FIG.21

| IDENTIFICATION INFORMATION | LATITUDE | LONGITUDE | FLOOR NUMBER | BUILDING | RECEIVED DATE AND TIME | APPARATUS NAME | DEPARTMENT |
|---|---|---|---|---|---|---|---|
| 002673abcdef01 | 35.459555 | 139.387110 | 16 | C | 11/12/12 13:30:01 | PJ WX4310 | SALES DEPT. 1 |
| 002673abcdef02 | 35.459483 | 139.388437 | 4 | A | 11/12/12 13:30:03 | UCS P3000 | SALES DEPT. 1 |
| .. | .. | .. | .. | .. | .. | .. | |
| .. | .. | .. | .. | .. | .. | .. | |

FIG.23

LOCATION SEARCH SYSTEM

| DEPARTMENT | APPARATUS NAME |
|---|---|
| SALES DEPT. 1 | PJ WX4310 |
| | UCS P3000 |
| | : |
| | : |
| SALES DEPT. 2 | PJ WX3231N No.1 |
| | PJ WX3231N No.2 |
| | PJ WX3231N No.3 |

SEARCH EXECUTION

LIGHT DEVICE AND POSITIONAL INFORMATION MANAGEMENT SYSTEM

BACKGROUND OF THE INVENTION

1. Field of the Invention

The present invention relates to a light device and a positional information management system.

2. Description of the Related Art

Various positional information management systems have been proposed to determine and manage the position of a wireless terminal, or a person or a thing which has a wireless terminal, in such a facility or the like in which it is difficult to accurately carry out positioning using GPS or the like.

In such a positional information management system, a plurality of transmitters for transmitting positional information to the wireless terminals are installed on the ceiling of a room or the like, for example. However, for this purpose, new power supply installation work is needed for supplying the power to the transmitters, and thus, the introduction cost may be increased.

International Patent Publication No. 2005/086375 discloses a system in which the position of the wireless terminal is determined as a result of the wireless terminal receiving unique information from a light device and transmitting the unique information to a server. According to the system of International Patent Publication No. 2005/086375, communication with the wireless terminal is made available using the power supplied to the light device as a result of providing the light device with a function of transmitting the unique information to the wireless terminal. Thus, it is not necessary to carry out new power supply installation work at a time of introducing the system.

However, according to the system of International Patent Publication No. 2005/086375, in the case of incorporating a wireless communication module for transmitting/receiving the unique information to/from the wireless terminal in the light device, the wireless communication module may obstruct the light irradiated from a light source of the light device depending on the placement of the wireless communication module.

SUMMARY OF THE INVENTION

According to one embodiment of the present invention, a light device includes a light emitting module in which a plurality of light sources are provided; caps that are provided at two ends of the light emitting module and are to be mounted on a lighting fixture; and a positional information transmission part that is provided between an outermost one of the plurality of light sources of the light emitting module and the cap and transmits predetermined positional information.

Other objects, features and advantages of the present invention will become more apparent from the following detailed description when read in conjunction with the accompanying drawings.

BRIEF DESCRIPTION OF THE DRAWINGS

FIG. 18 shows an example of information that the light device according to the second embodiment has;

FIG. 19 shows an example of information that the wireless terminal according to the second embodiment has;

FIG. 20 shows an example of a format of positional information that the wireless terminal according to the second embodiment transmits;

FIG. 21 shows an example of information that the management server according to the second embodiment has;

FIG. 23 shows an example of a search screen page of the management server according to the second embodiment.

DETAILED DESCRIPTION OF THE EMBODIMENTS

Below, the embodiments will be described using the figures, in the order of "1. System", "2. Hardware Configuration Example", "3. Function" and "4. Operational Sequence".

(1. System)

Figure 1:
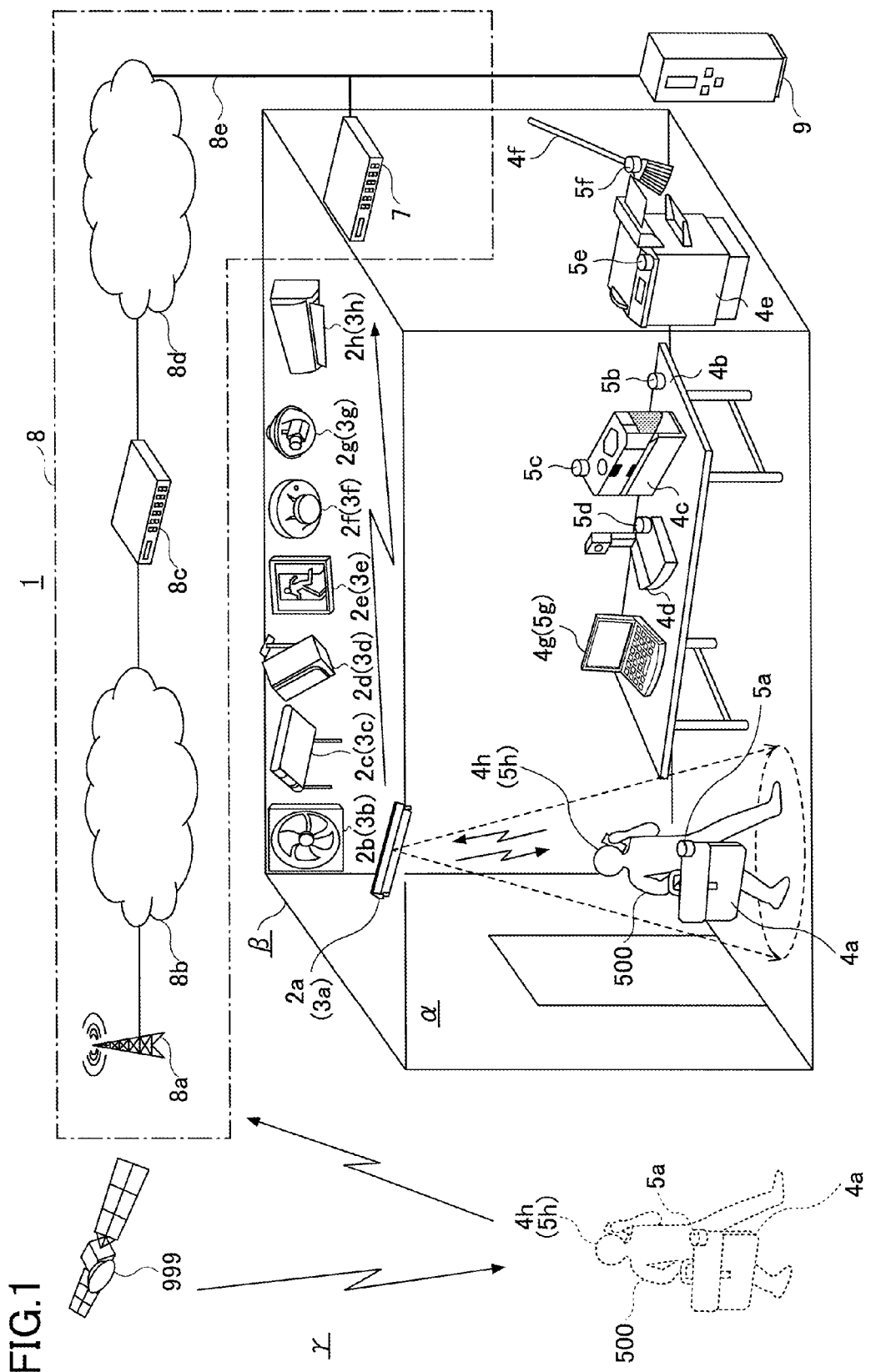
FIG. 1 shows a positional information management system according to a first embodiment.

FIG. 1 shows the entirety of a positional information management system 1 according to the first embodiment.

As shown in FIG. 1, the positional information management system 1 according to the first embodiment includes a plurality of delivery devices (3a, 3b, 3c, 3d, 3e, 3f, 3g and 3h) on the side of a ceiling β inside a room α; a plurality of communication terminals (5a, 5b, 5c, 5d, 5e, 5f, 5g and 5h) on the side of a floor inside the room a; and a positional information management apparatus 9.

Further, the respective delivery devices (3a, 3b, 3c, 3d, 3e, 3f, 3g and 3h) store sets of positional information (Xa, Xb, Xc, Xd, Xe, Xf, Xg and Xh) indicating positions at which the respective delivery devices (3a, 3b, 3c, 3d, 3e, 3f, 3g and 3h) are to be installed (which means the positions at which the respective delivery devices (3a, 3b, 3c, 3d, 3e, 3f, 3g and 3h) are located after they have been installed), and deliver the respective sets of positional information (Xa, Xb, Xc, Xd, Xe, Xf, Xg and Xh) toward the floor inside the room a. Further, the respective delivery devices (3a, 3b, 3c, 3d, 3e, 3f, 3g and 3h) store sets of device identification information (Ba, Bb, Bc, Bd, Be, Bf, Bg and Bh) for identifying themselves, respectively.

It is noted that hereinafter, any one of the plurality of delivery devices (3a, 3b, 3c, 3d, 3e, 3f, 3g and 3h) will be referred to as a "delivery device 3", and any one of the plurality of communication terminals (5a, 5b, 5c, 5d, 5e, 5f, 5g and 5h) will be referred to as a "communication terminal 5". Further, hereinafter, "positional information" will denote any one of the plurality of sets of positional information (Xa, Xb, Xc, Xd, Xe, Xf, Xg and Xh), and "device identification information" will denote any one of the plurality of sets of device identification information (Ba, Bb, Bc, Bd, Be, Bf, Bg and Bh). As the device identification information, a media access control (MAC) address may be used, for example.

The respective communication terminals (5a, 5b, 5c, 5d, 5e, 5f, 5g and 5h) store sets of terminal identification information (Aa, Ab, Ac, Ad, Ae, Af, Ag and Ah) for identifying themselves, respectively. Hereinafter, "terminal identification information" will denote any one of the plurality of sets of terminal identification information (Aa, Ab, Ac, Ad, Ae, Af, Ag and Ah). As the terminal identification information, a media access control (MAC) address may be used, for example. When having received the positional information from the delivery devices 3, the respective communication terminals 5 transmit the positional information to the delivery devices 3 together with the own terminal identification information, respectively.

The respective delivery devices 3 are mounted in the inside or on the exterior of electric devices (2a, 2b, 2c, 2d, 2e, 2f, 2g and 2h) installed on the ceiling β inside the room α, respectively. Hereinafter, any one of the plurality of the electric devices (2a, 2b, 2c, 2d, 2e, 2f, 2g and 2h) will be referred to as an "electric device 2".

The respective electric devices 2 supply the power to the delivery devices 3, respectively. Thereamong, the electric device 2a is a light-emitting-diode (LED) lighting fixture of a fluorescent light type. The electric device 2b is a ventilating fan. The electric device 2c is an access point for a wireless local area network (LAN). The electric device 2d is a speaker. The electric device 2e is an emergency light. The electric device 2f is a fire alarm or a smoke alarm. The electric device 2g is a monitoring camera. The electric device 2h is an air conditioner.

The respective electric devices 2 may be other things as long as they can supply the power to the corresponding delivery devices 3, respectively. For example, other than the above-mentioned examples of the electric devices 2, a common lighting fixture(s) other than the LED lighting fixture(s) such as a fluorescent light(s), an incandescent light(s), a burglar sensor(s) for detecting a person breaking into the room, and/or the like may be used.

The respective communication terminals 5 are mounted on the exterior of management targets (4a, 4b, 4c, 4d, 4e, 4f, 4g and 4h), respectively, the respective positions of which are managed by the positional information management apparatus 9.

Thereamong, the management target 4a is a bag that a user 500 has. The management target 4b is a table. The management target 4c is a projector.

The management target 4d is a video-conference terminal. The management target 4e is a multifunction product (MFP) having functions that include a copy function. The management target 4f is a broom.

The management target 4g is a personal computer, and also is the communication terminal 5g in this case since the function of the communication terminal 5g is included in the personal computer 4g. The management target 4h is a portable phone such as a smartphone, and also is the communication terminal 5h in this case since the function of the communication terminal 5h is included in the portable phone 4h. Hereinafter, any one of the plurality of the management targets will be referred to as a "management target 4".

The respective management targets 4 may be things different from those mentioned above. For example, other examples of the management targets 4 include a facsimile machine(s), a scanner(s), a printer(s), a copier(s), an electronic blackboard(s), an air purification system(s), a paper shredder(s), an automatic vending machine(s), a wristwatch(es), a camera(s), a game machine(s), a wheel chair(s) and a medical device(s) such as an endoscope(s).

Next, an outline of one example of a method of managing positional information using the positional information management system 1 will be described. According to the first embodiment, for example, the delivery device 3a installed on the ceiling β inside the room α delivers the positional information Xa indicating the position at which the delivery device 3a is installed via wireless communication. As a result, the communication terminal 5a receives the positional information Xa. Next, the communication terminal 5a transmits the terminal identification information Aa for identifying the communication terminal 5a and the positional information Xa to the delivery device 3a via wireless communication. In this case, the communication terminal 5a thus returns the positional information Xa that has been received from the delivery device 3a to the delivery device 3a.

Thereby, the delivery device 3a receives the terminal identification information Aa and the positional information Xa. Next, the delivery device 3a transmits the terminal identification information Aa and the positional information Xa to a gateway 7 in wireless communication. Then, the gateway 7 transmits the terminal identification information Aa and the positional information Xa to the positional information management apparatus 9 via a LAN 8e. The positional information management apparatus 9 manages the terminal identification information Aa and the positional information Xa, and thus the manager of the positional information management apparatus 9 can know the position inside the room a of the communication terminal 5a (the management target 4a).

That is, by thus managing the terminal identification information Aa of the communication terminal 5a and the positional information Xa of the delivery device 3a to be associated with each other, the positional information management apparatus 9 can provide information indicating that the position of the management target 4a corresponds to the position of the delivery device 3a.

Further, among the communication terminals 5, in particular, the communication terminals (5g (personal computer 4g) and 5h (portable phone 4h)) can receive, when they are outdoors γ, wireless signals (time-of-day information, trajectory information and/or the like) from a global-positioning-system (GPS) satellite 999 (see FIG. 1) and calculate their own positions Xg' and Xh' on the globe, respectively. Then, the communication terminals 5g and 5h can also transmit the respective sets of terminal identification information Ag and Ah for identifying themselves, respectively, and the respective sets of positional information Xg' and Xh' via a base station 8a, a mobile communication network 8b, a gateway 8c, the Internet 8d and the LAN 8e, using a mobile communication system of third generation (3G), fourth generation (4G) or the like, to the positional information management apparatus 9, respectively.

It is noted that a communication network 8 includes the base station 8a, the mobile communication network 8b, the gateway 8c, the Internet 8d, the LAN 8e and the gateway 7. Further, in order to determine the latitude and longitude on the globe, at least three GPS satellites are required (four thereof are required if the altitude is also to be determined). However, for the purpose of simplifying the description, FIG. 1 shows the single GPS satellite 999.

Figure 2:
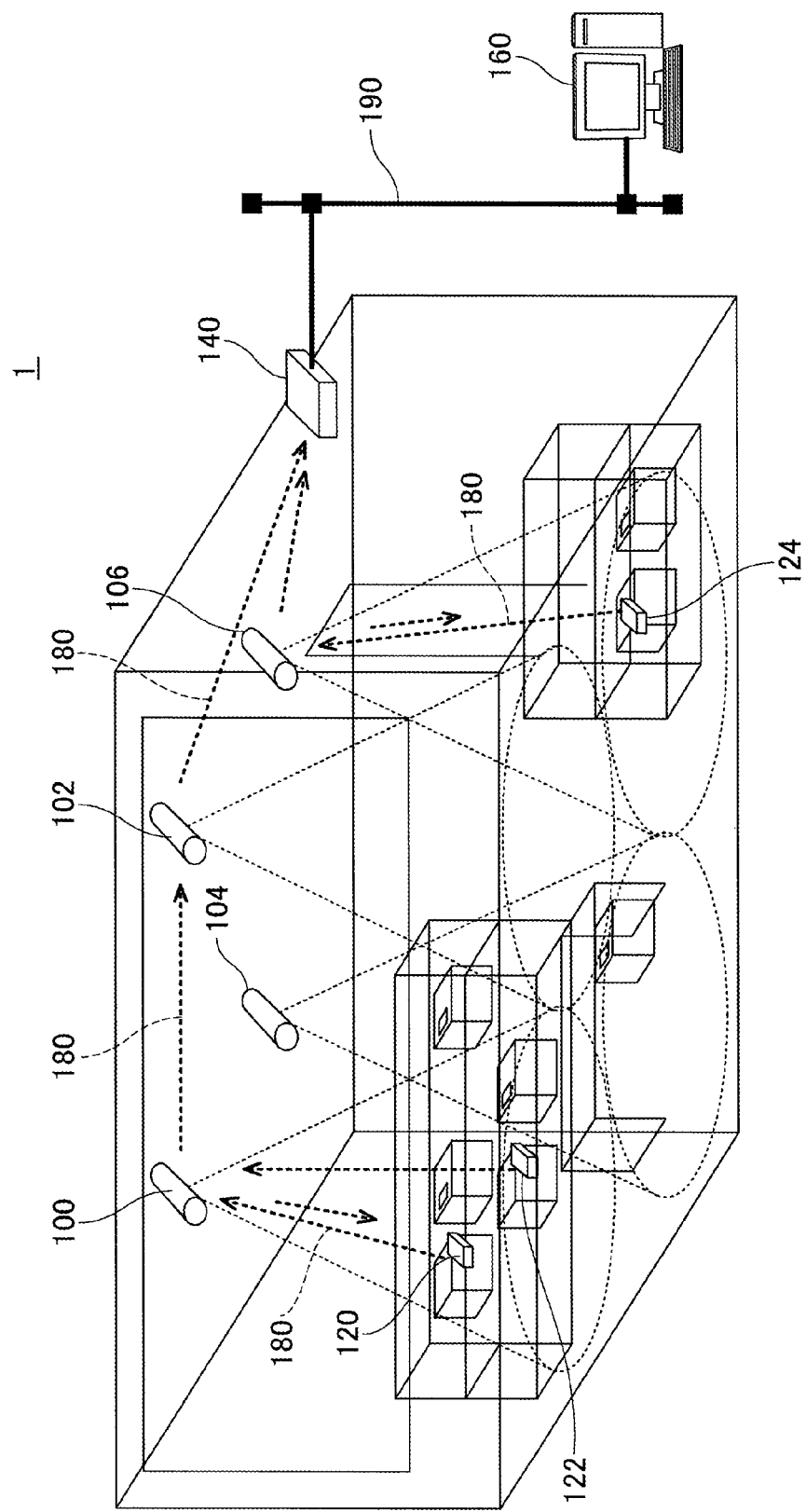
FIG. 2 also shows a positional information management system according to a second embodiment.
Figure 3:
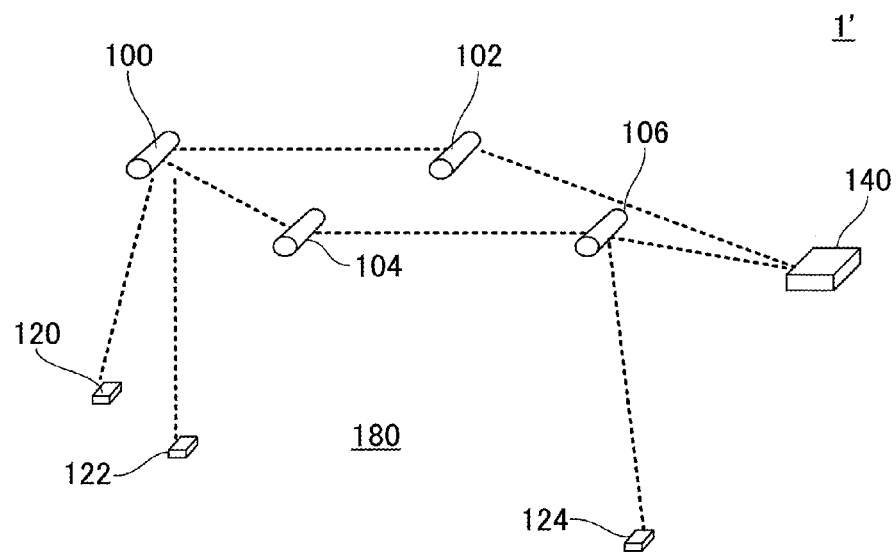
FIG. 3 shows a network included in the positional information management system according to the second embodiment.

FIG. 2 shows a positional information management system 1' according to the second embodiment. According to the second embodiment of FIG. 2, the respective light devices 150 (see FIG. 4) of lighting fixtures 100, 102, 104 and 106 are used as examples of the electric devices 2 having the delivery devices 3 mentioned above. As shown in FIG. 2, the positional information management system 1' according to the second embodiment includes the lighting fixtures 100, 102, 104 and 106 (as the electric devices 2 having the respective delivery devices 3); wireless terminals 120, 122 and 124 (as the communication terminals 5); a management apparatus 140; and a management server 160. Further, the positional information management system 1' includes a network 180 including the lighting fixtures 100, 102, 104 and 106, the wireless terminals 120, 122 and 124 and the management apparatus 140; and a network 190. The network 180 is a wireless network managed by the management apparatus 140. FIG. 3 shows the lighting fixtures 100, 102, 104 and 106, the wireless terminals 120, 122 and 124 and the management apparatus 140 included in the wireless network 180 extracted from FIG. 2.

The lighting fixtures 100, 102, 104 and 106 are mounted, for example, on a ceiling of a room, and continuously or intermittently transmit, in a wireless manner, respective sets of positional information of themselves (hereinafter, simply referred to as "positional information") such as longitude and latitude information, a building number and a floor number in a building and/or the like concerning the position at which the corresponding one of the lighting fixture 100, 102, 104 and 106 is installed. The lighting fixtures 100, 102, 104 and 106 thus transmit the respective sets of positional information, which the lighting fixtures 100, 102, 104 and 106 respectively have, to predetermined areas, using wireless signals, respectively. The predetermined areas are limited by signal strengths of the used wireless signals, respectively. The lighting fixtures 100, 102, 104 and 106 are placed at positions to cover the zones that are targets to manage positions, respectively, and the zones are defined so that they do not overlap each other. Alternatively, even in a case where the zones may overlap each other, a configuration may be provided such that each part that receives the positional information can identify the corresponding lighting fixture based on the strength of the received radio waves. In the example of FIG. 2, conical broken lines shown below the respective lighting fixtures 100, 102, 104 and 106 show the predetermined areas. As the communication method to transmit the positional information, for example, an indoor messaging system (IMES) may be used.

The wireless terminals 120, 122 and 124 can receive the wireless signals transmitted by the nearest ones of the lighting fixtures 100, 102, 104 and 106, respectively. In the example of FIG. 2, the respective wireless terminals 120, 122 and 124 are attached to management targets having shapes of rectangular parallelepipeds for which the positions are to be managed, respectively. The wireless terminals 120, 122 and 124 are terminals that can transmit radio waves by themselves, and thus, are, for example, terminals such as active tags. Below, the wireless terminal 120 will be described as a typical one of the wireless terminals 120, 122 and 124. Each of the other wireless terminals 122 and 124 has generally the same configuration as that of the wireless terminal 120.

The wireless terminal 120 is within an area of being able to receive the wireless signal from the lighting fixture 100, and therefore receives the positional information of the lighting fixture 100. Receiving the positional information of the lighting fixture 100 may be carried out by using IMES, for example. The wireless terminal 120 transmits information including its own identification information such as a network address to the lighting fixture 100 together with the received positional information. The transmitting is carried out using the network 180 that is according to short-range wireless communication such as IEEE 802.15.4 and ZigBee (registered trademark). In this case, as the identification information of the wireless terminal 120, a short address as specified in IEEE 802.15.4 or an IEEE extended (MAC) address may be used. The identification information and the positional information thus transmitted to the lighting fixture 100 are then transmitted to the management apparatus 140 via the adjacent lighting fixture 102. It is noted that the transmitting and receiving operations of the wireless terminal 120 are carried out in timing predetermined for the wireless terminal 120 or in timing when a change in the acceleration at the wireless terminal 120 has been detected by an acceleration sensor that the wireless terminal 120 has.

The management apparatus 140 connects the network 180 and the network 190 together, and sends data transmitted from the network 180 to the network 190 by bridging therebetween. The management apparatus 140 is installed, for example, on each floor of the building, or in each room separated by walls or the like. In a case where the network 180 is a personal area network (PAN) according to IEEE 802.15.4 and ZigBee (registered trademark) and the network 190 is a local area network (LAN) based on the IEEE 802.3 standard, the communication system is converted therebetween. Further, in a case where the identification information of the wireless terminal 120 is expressed by a short address as specified in IEEE 802.15.4, this is converted into the IEEE extended address based on the information used at the time of configuring the PAN, and then, the identification information is transmitted to the management server 160.

The management server 160 records the identification information and the positional information thus received via the management apparatus 140 together with the received date and time, and manages the positions of the corresponding ones of the lighting fixtures 100, 102, 104 and 106. In the management server 160, the management targets concerning the wireless terminals 120, 122 and 124, respectively, are previously recorded. Thus, by using the recorded information, the management server 160 can search for the locations (whereabouts) of the management targets.

That is, by thus managing the sets of identification information of the wireless terminals 120, 122 and 124 and the sets of positional information of the nearest ones of the lighting fixtures 100, 102, 104 and 106 to be associated with each other, respectively, the management server 160 can provide information indicating that the respective positions of the management targets (corresponding to the wireless terminals 120, 122 and 124) correspond to the positions of the lighting fixtures which are thus managed to be associated with the wireless terminals 120, 122 and 124 (corresponding to the respective management targets). For example, by managing the identification information of the wireless terminal 120 and the positional information of the lighting fixture 100 to be associated with each other, the management server 160 can provide information indicating that the position of the management target to which the wireless terminal 120 is attached corresponds to the position of the lighting fixture 100.

The network 180 is, for example, the PAN that meets the IEEE 802.15.4 and ZigBee (registered trademark) standards, which connects the respective lighting fixtures 100, 102, 104 and 106, wireless terminals 120, 122 and 124 and management apparatus 140. In the case where the PAN is configured according to the IEEE 802.15.4 and ZigBee (registered trademark) standards, the wireless terminals 120, 122 and 124, the lighting fixtures 100, 102, 104 and 106 and the management apparatus 140 have end device functions, router functions and a coordinator function defined by the ZigBee (registered trademark) standard, respectively. Then, the respective lighting fixtures 100, 102, 104 and 106 and wireless terminals 120, 122 and 124 come under the control of the management apparatus 140 at a time of being started up, and form the PAN, and the minimum paths (routes) thereof to the management apparatus 140 are determined.

The network 190 is a network connecting the management apparatus 140 and the management server 160, and is, for example, a LAN defined by IEEE 802.3 standard.

As mentioned above, in the positional information management system 1' according to the second embodiment, the wireless terminals 120, 122 and 124 can transmit the identification information and the positional information to the management server 160 using only power necessary to communicate with the nearest ones of the lighting fixtures 100, 102, 104 and 106, respectively. Further, the communication functions for communicating with the wireless terminals 120, 122 and 124 and the management apparatus 140 are provided in the lighting fixtures 100, 102, 104 and 106, respectively. Thus, it is not necessary to install a new infrastructure for supplying the power required for the communication functions, and thus, it is possible to reduce the introduction cost.

It is noted that it is also possible to transmit the positional information of the lighting fixtures 100, 102, 104 and 106 using the network 180. Thereby, the transmitting system such as IMES for transmitting the positional information becomes unnecessary.

Further, in a case where the management apparatus 140 exists nearer to the wireless terminal 120 than to the lighting fixture 100 that has transmitted the positional information thereto, the wireless terminal 120 may transmit the identification information and the positional information rather to the management apparatus 140 directly. Thereby, it is possible to transmit the identification information and the positional information to the management server 160 using the shortest path (route).

Further, it is also possible to integrate the function of the management apparatus 140 to the management server 160. Thereby, the separate management apparatus 140 becomes unnecessary.

The wireless terminals 120, 122 and 124 may be wireless terminals having functions equal to active tags such as smartphones, PDAs, PCs or smart meters. Thereby, it is possible to manage the positional information of the existing wireless terminals without attaching tags thereto.

Further, in addition to the above-mentioned positional information, it is also possible to include information for determining a finer position such as information indicating one of divisions inside a room. Thereby, it is possible to carry out more refined position management.

Further, the management targets may be persons. Thereby, it is possible to manage the locations (whereabouts) of the persons by the system 1'.

Further, the network 180 may be configured using short-range wireless communication such as Bluetooth, LE, ANT, Z-Wave or the like. Thereby, it is possible to manage the positional information of various wireless terminals.

Further, the network 190 may include plural networks such as the Internet, for example. Thereby, it is possible to manage the positional information of the wireless terminals without regard to the physical positional relationship between the network 180 and the management server 160.

(2. Hardware Configuration Example)

Next, the hardware configurations of the lighting fixture 100, the wireless terminal 120, the management apparatus 140 and the management server 160 included in the positional information management system 1' will be described.

Figure 4:
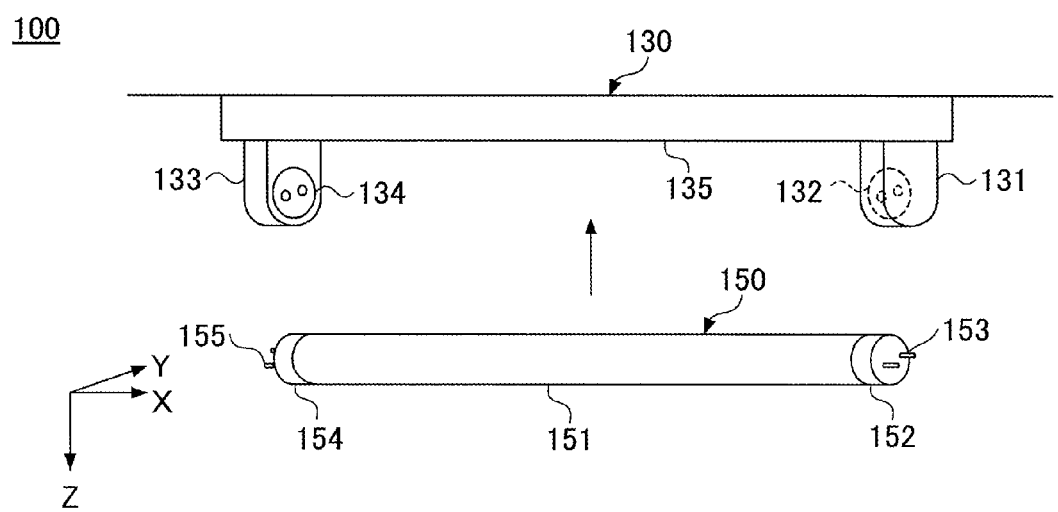
FIG. 4 illustrates an external appearance of a lighting fixture according to the second embodiment.

FIG. 4 illustrates an external appearance of the lighting fixture 100 according to the second embodiment. It is noted that the hardware configuration of the lighting fixture 100 will now be described as a typical example of the lighting fixtures 100, 102, 104 and 106, and each of the other lighting fixtures 102, 104 and 106 has generally the same hardware configuration as the lighting fixture 100.

Hereinafter, three directions perpendicular to each other will be referred to as an X-direction (the longitudinal direction of the light device 150), a Y-direction (the lateral direction of the light device 150) and a Z-direction (the vertical direction).

As shown in FIG. 4, the light device 150 is, for example, a straight-tube-type lamp, and is mounted in a lighting fixture body 130.

The lighting fixture body 130 is installed onto, for example, the ceiling of the room. The lighting fixture body 130 includes a body 135 installed onto the ceiling or the like; and a first socket 131 and a second socket 133 as examples of fixtures into which the ends of the light device 150 are mounted, respectively. The first socket 131 has a power supply terminal 132 for supplying the power to the light device 150. The second socket 133 has a power supply terminal 134 for supplying the power to the light device 150. The lighting fixture body 130 supplies the power to the light device 150, the two ends of which are mounted on the first socket 131 and the second socket 133, respectively, from a power supply part 218 (see FIG. 9, described later) provided inside, via the power supply terminals 132 and 134.

The light device 150 has a translucent cover 151, caps 152 and 154 provided at the ends, connection terminals 153 and 155, and light sources inside. The translucent cover 151 is formed by a resin material such as an acrylic resin, and is provided in such a manner to cover the light sources provided inside. The caps 152 and 154 are mounted on the first socket 131 and the second socket 133 of the lighting fixture body 130, respectively. The caps 152 and 154 are made of metal, plastic or the like. The connection terminals 153 and 155 are connected to the power supply terminals 132 and 134 when the light device 150 is mounted in the lighting fixture body 130, and receive the supplied power. The light sources provided inside the light device 150 emit light by the power supplied from the connection terminals 153 and 155, and irradiate the light to the outside via the translucent cover 151.

Figure 5:
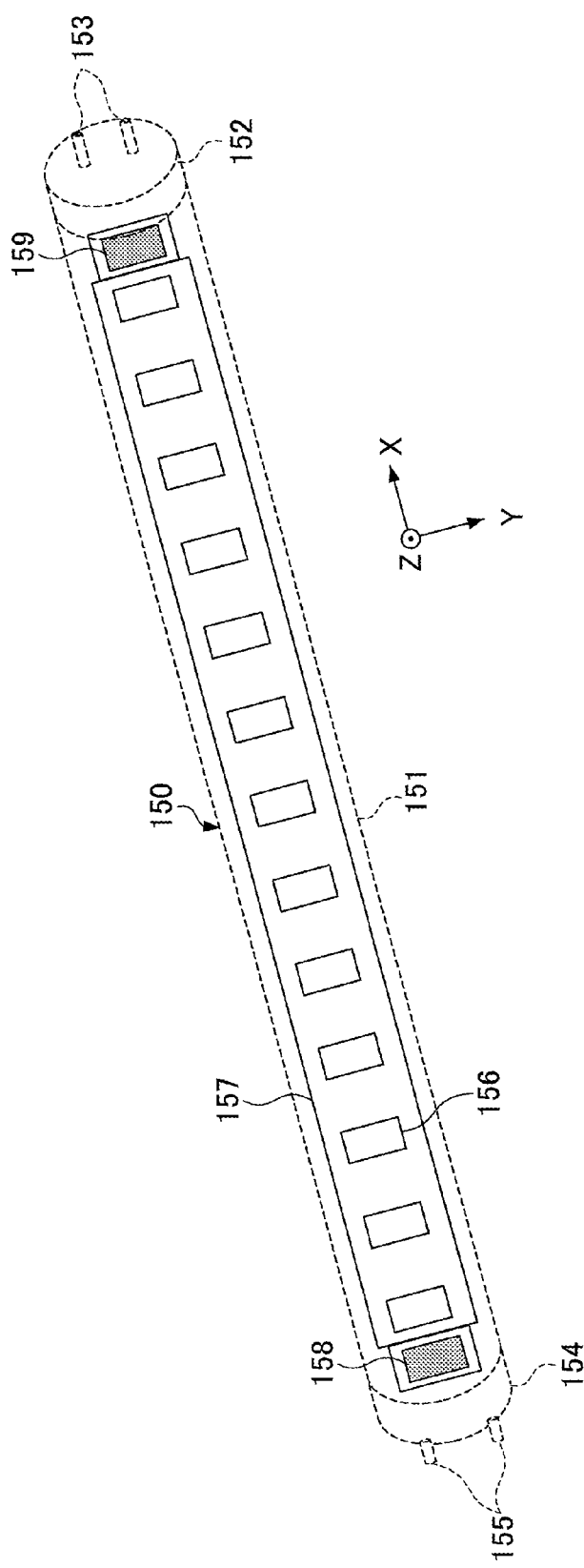
FIG. 5 illustrates a general configuration of a light device according to the second embodiment.

FIG. 5 illustrates a general configuration of the light device 150 according to the second embodiment. The light device 150 has a substrate 157 on which LED elements 156 (light sources) are mounted, as one example of a light emitting module, and irradiates light from the LED elements 156 to the outside. The plurality of LED elements 156 are arranged on one side of the substrate 157 along the longitudinal direction (X-direction) of the light device 150. The substrate 157 is mounted in the light device 150 in such a manner that when the light device 150 is mounted in the lighting fixture body 130, the side on which the LED elements 156 are mounted face the room inside from the body 135, for example. It is noted that as the light sources, it is possible to thus employ semiconductor light emitting devices such as the LED elements, EL elements or the like. The shape of the substrate 157, the arrangement of the LED elements 156 on the substrate 157 and/or the number of the LED elements 156, and so forth, may be appropriately determined depending on the length and/or the diameter of the light device 150.

Inside the light device 150, a positional signal transmitter 158 (as one example of a positional information transmission part) and a wireless communication device 159 (as one example of a wireless communication part) are provided. The positional signal transmitter 158 is a device including an antenna that transmits a positioning signal of IMES or the like, and transmits the positional signal (positioning signal) indicating the predetermined positional information of the light device 150 or the like to the wireless terminal 120. The wireless communication device 159 is a device including an antenna capable of transmitting and receiving radio waves that are in conformity with, for example, IEEE 802.15.4 standard. The wireless communication device 159 receives, from the wireless terminal 120 that has received the positional signal, the identification information of the wireless terminal 120 and the positional information, and transmits the received identification information and positional information to the management server 160 that manages the position of the wireless terminal 120 via the management apparatus 140.

Figure 6:
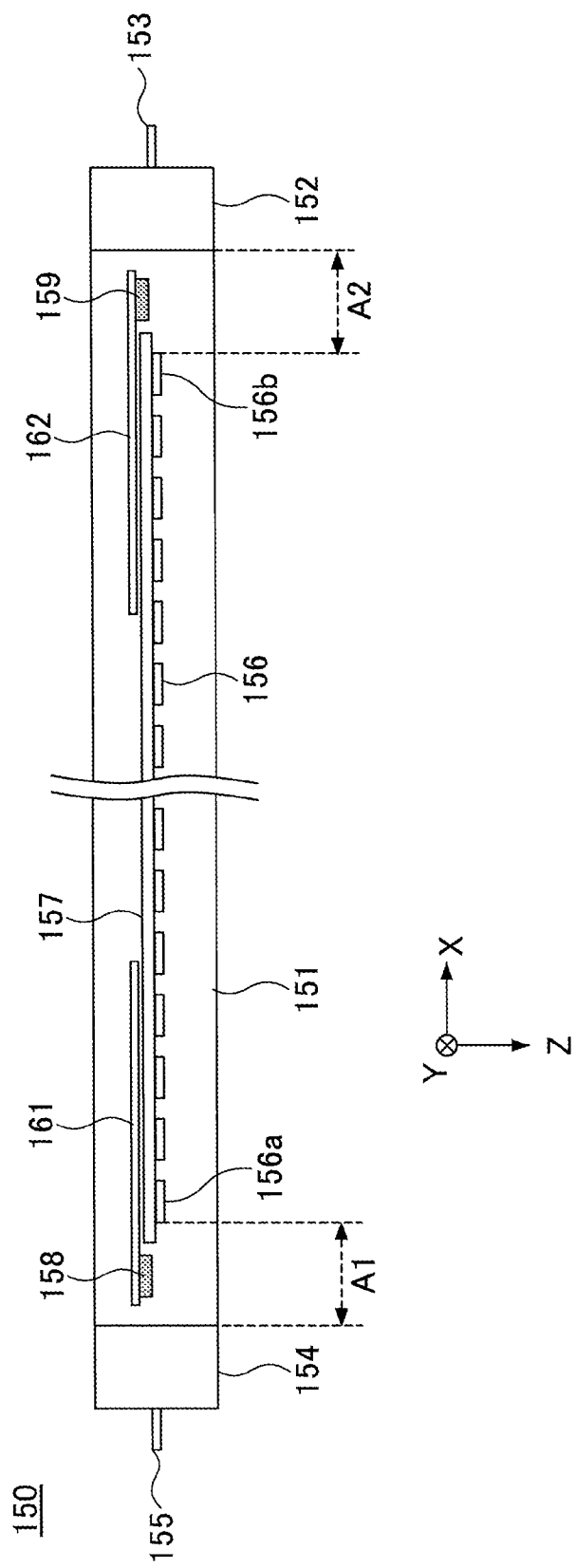
FIG. 6 is a general sectional view of one configuration example of the light device according to the second embodiment.

FIG. 6 illustrates a configuration example of the light device 150 according to the second embodiment. As mentioned above, the light device 150 includes, inside, the substrate 157 on which the plurality of LED elements 156 are arranged, the positional signal transmitter 158 and the wireless communication device 159. The light device 150 further includes, inside, a positional signal transmission module 161 and a wireless communication module 162. The positional signal transmission module 161 is, for example, a substrate having a circuit that functions as a transmission control part controlling transmission of the positional signal by the positional signal transmitter 158. The wireless communication module 162 is, for example, a substrate having a circuit that functions as a wireless communication control part controlling communication between the wireless communication device 159 and the wireless terminal 120, 122 or 124 or the management server 160 (via the management apparatus 140). The positional signal transmission module 161 and the wireless communication module 162 are provided on the side of the substrate 157 opposite to the side on which the LED elements 156 are provided, so as to avoid obstructing the light irradiated by the LED elements 156.

The positional signal transmitter 158 is provided in an area A1 between the outermost LED element 156a on the substrate 157 and the cap 154 along the longitudinal direction (X-direction) of the light device 150. The wireless communication device 159 may be provided in an area A2 between the outermost LED element 156b on the substrate 157 and the cap 152. By providing the positional signal transmitter 158 in any one of the areas A1 and A2, it is possible to transmit the positional signal to the wireless terminal 120, 122 or 124 without obstructing the light irradiated by the LED elements 156.

As shown in FIG. 6, it is possible to provide the positional signal transmitter 158 on the substrate of the positional signal transmission module 161, for example.

Figure 7:
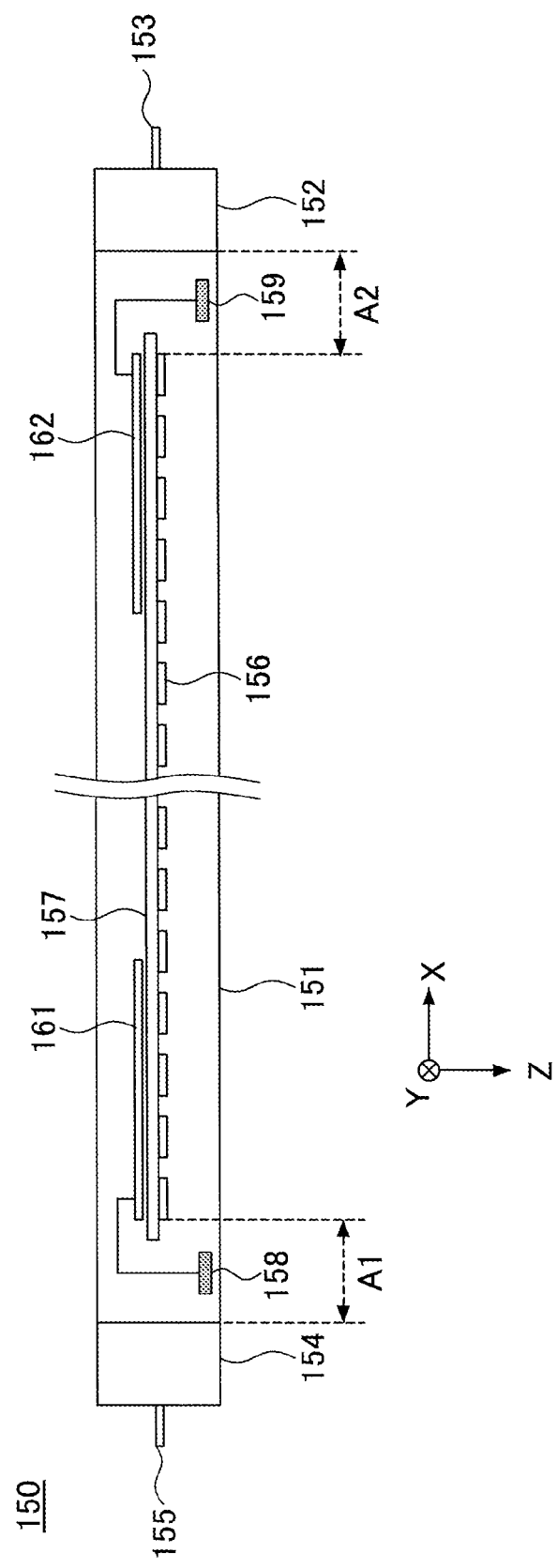
FIG. 7 is a general sectional view of another configuration example of the light device according to the second embodiment.

Further, as long as the positional signal transmitter 158 is provided in the area A1 or A2, it is also possible to provide the positional signal transmitter 158 at a position different from a position on the substrate of the positional signal transmission module 161, as shown in FIG. 7, for example. In this case, it is preferable to provide the positional signal transmitter 158 near the translucent cover 151 lower in the Z-direction than the substrate 157 in the light device 150, as shown in FIG. 7.

Figure 8:
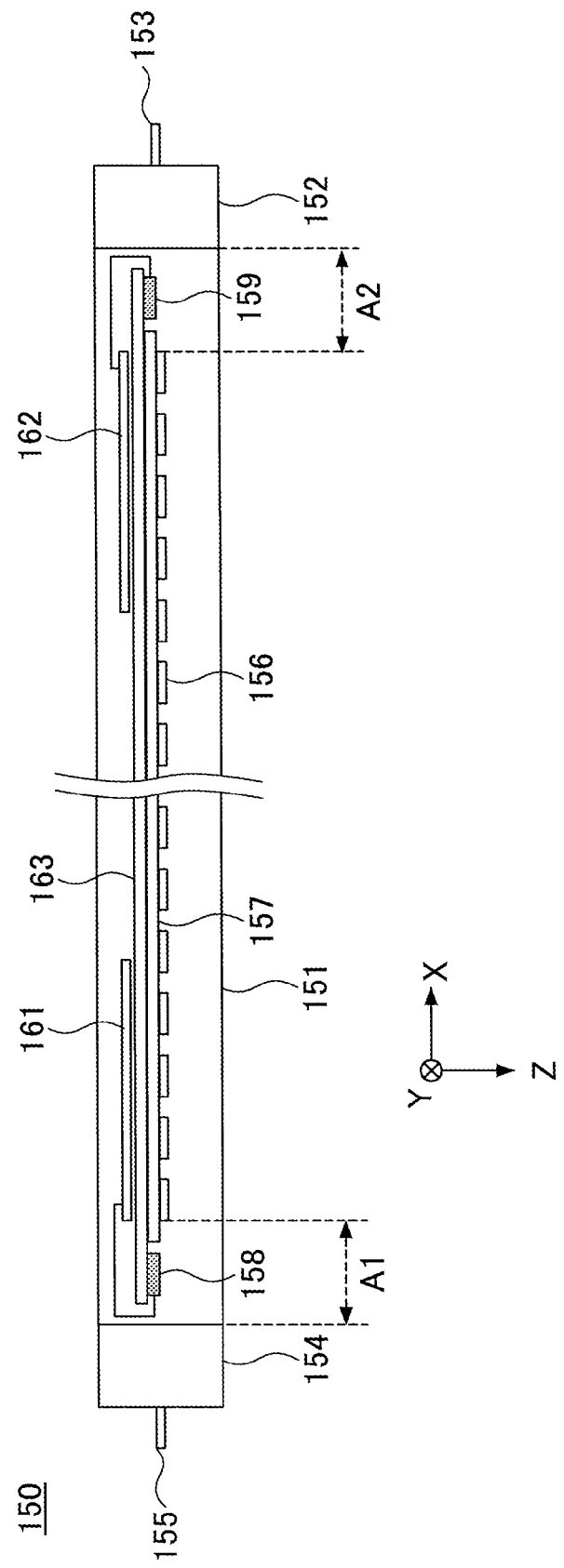
FIG. 8 is a general sectional view of yet another configuration example of the light device according to the second embodiment.

Further alternatively, it is also possible to, as shown in FIG. 8, provide the positional signal transmitter 158 at an end of a surface of a metal member 163 on the side adjacent to the substrate 157, and the metal member 163 is a member formed integrally with a part of the translucent cover 151, for example. In this case, the positional signal transmitter 159 can use the metal member 163 as the ground of the antenna.

Further, it is preferable that the surface of the positional signal transmitter 158 is colored the same color as the emission color of the LED elements 156 or the color of the translucent cover 151.

The wireless communication device 159 is provided in any one of the areas A1 and A2 the same as or similarly to the positional signal transmitter 158. By providing the wireless communication device 159 in any one of the areas A1 and A2, the wireless communication device 159 can carry out communication of the positional information and the identification information with the wireless terminal 120, 122 or 124 and the management server 160 (via the management apparatus 140) without obstructing the light irradiated by the LED elements 156.

The positional signal transmitter 158 and the wireless communication device 159 may be installed together in the same one of any one of the areas A1 and A2 or may be installed at the opposite areas A1 and A2, respectively.

Further, it is preferable that the surface of the wireless communication device 159 is colored the same color as the emission color of the LED elements 156 or the color of the translucent cover 151.

Figure 9:
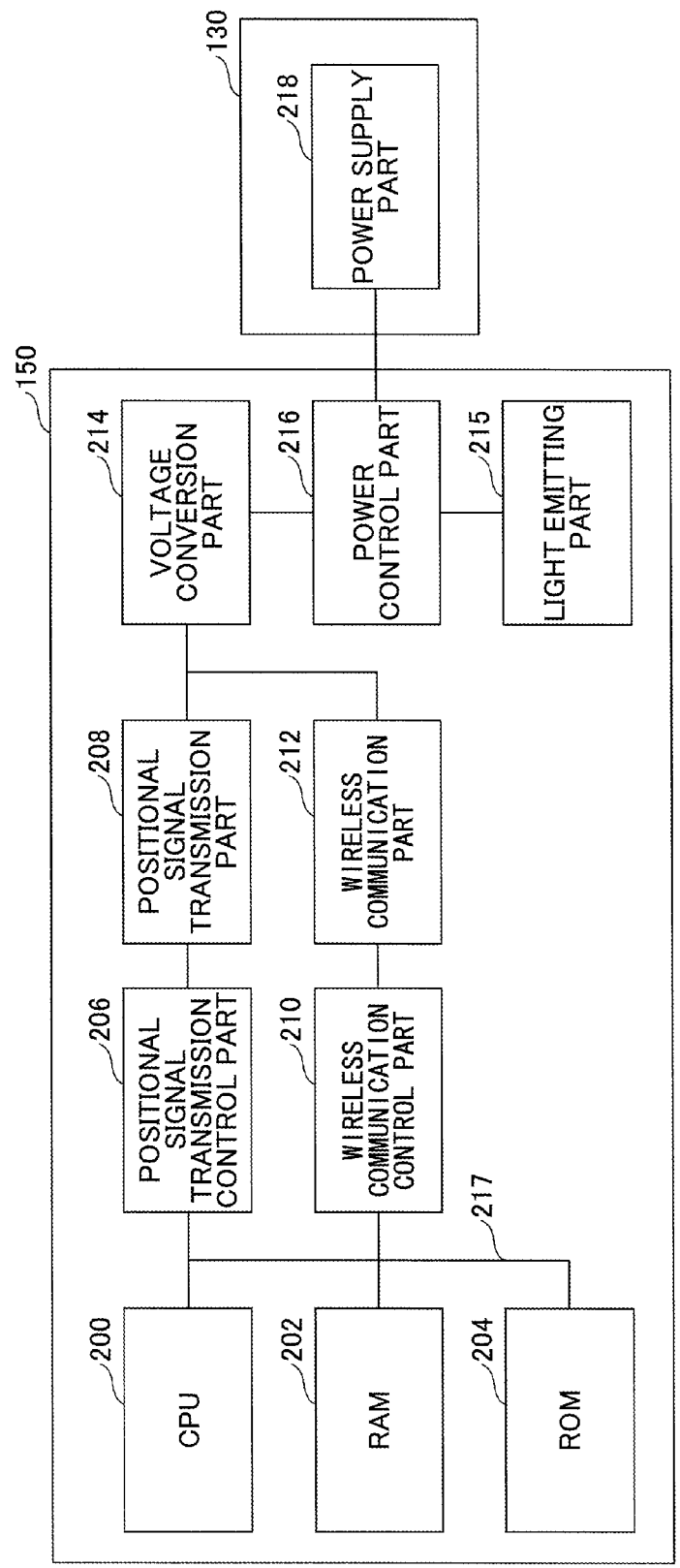
FIG. 9 is a hardware configuration diagram of the lighting fixture according to the second embodiment.

FIG. 9 shows a hardware configuration of the lighting fixture 100 according to the second embodiment. The light device 150 of the lighting fixture 100 includes a CPU 200, a RAM 202, a ROM 204, a positional signal transmission control part 206, a positional signal transmission part 208, a wireless communication control part 210, a wireless communication part 212, a voltage conversion part 214, a light emitting part 215, a power control part 216 and a bus 217.

The CPU 200 executes a program prepared for carrying out control of the operations of communication and so forth of the light device 150. The RAM 202 provides a work area for the CPU 200, or the like. The ROM 204 stores the program that the CPU 200 executes and the positional information of the lighting fixture 100. The positional signal transmission control part 206 carries out a process for transmitting the positioning signal (positional signal) indicating the positional information of the lighting fixture 100 via the positional signal transmission part 208. The positional signal transmission part 208 is the positional signal transmitter 158 that the light device 150 has. The wireless communication control part 210 carries out a wireless communication process using the wireless communication part 212. The wireless communication part 212 is the wireless communication device 159 that the light device 150 has. The voltage conversion part 214 includes, for example, a DC-DC converter, and converts the voltage of the power supplied by the power control part 216 into the voltage to be used for operating the positional signal transmission part 208 and the wireless communication part 212. The light emitting part 215 is the substrate 157 on which the LED elements 156 are provided in the light device 150 shown in FIG. 5. The power control part 216 includes, for example, a smoothing circuit and a current monitoring circuit, and converts the supplied power into one suitable to operate the light emitting part 215. The bus 217 electrically connects the above-mentioned respective parts/devices.

By the above-mentioned configuration, the light device 150 of the lighting fixture 100 according to the second embodiment can transmit the positional information to the wireless terminal 120, receive the identification information and the positional information from the wireless terminal 120 and transmit the identification information and positional information to the management server 160 via the management apparatus 140. The lighting fixture 100 may be, for example, an emergency light provided at an emergency exit or the like. Further, in a case where, as described above, the positional information is transmitted to the wireless terminal 120 using the wireless communication control part 210 and the wireless communication part 212, the positional signal transmission control part 206 and the positional signal transmission part 208 become unnecessary.

Figure 10:
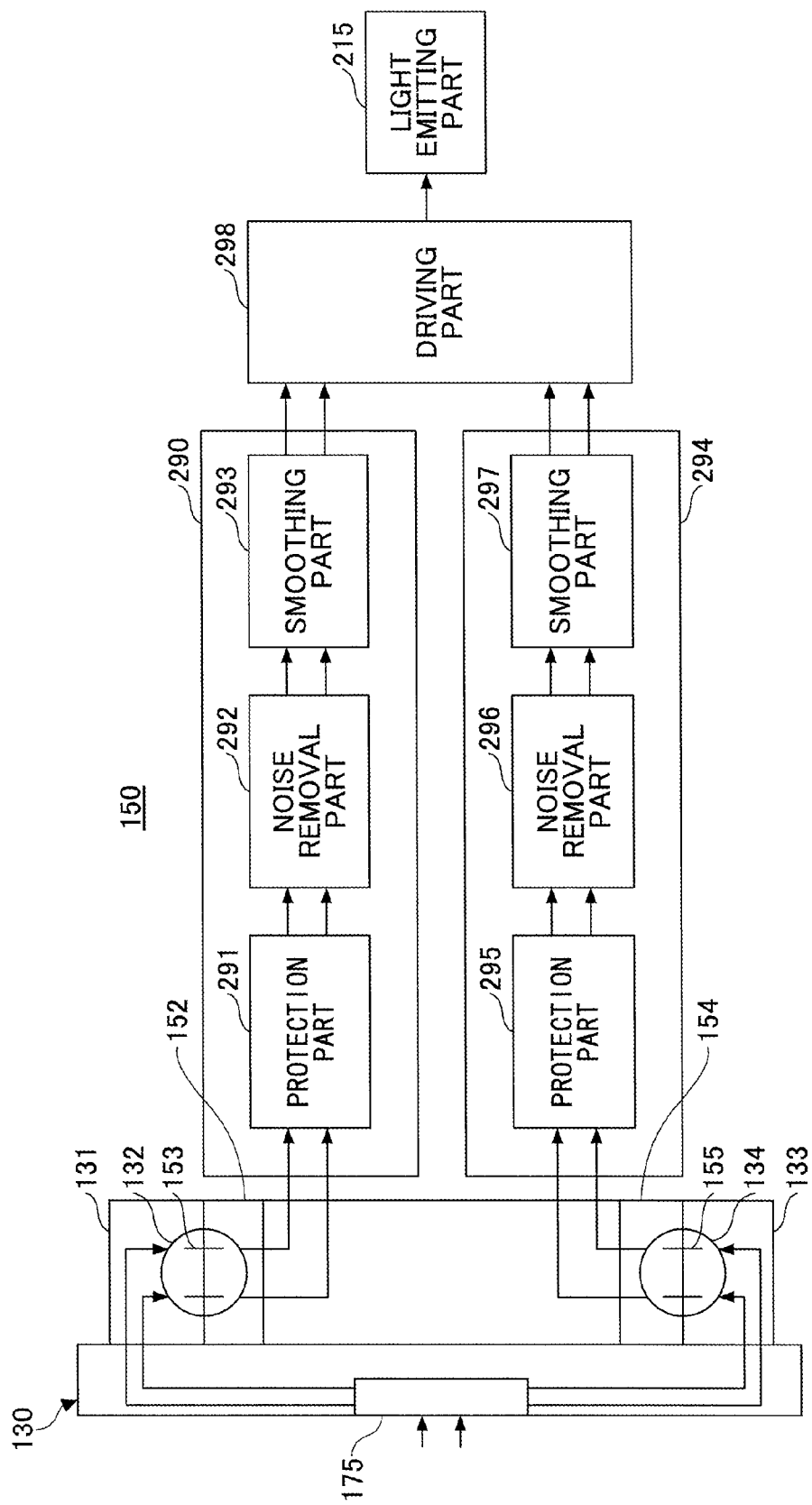
FIG. 10 is a general block diagram of a driving circuit of the light device according to the second embodiment.
Figure 15:
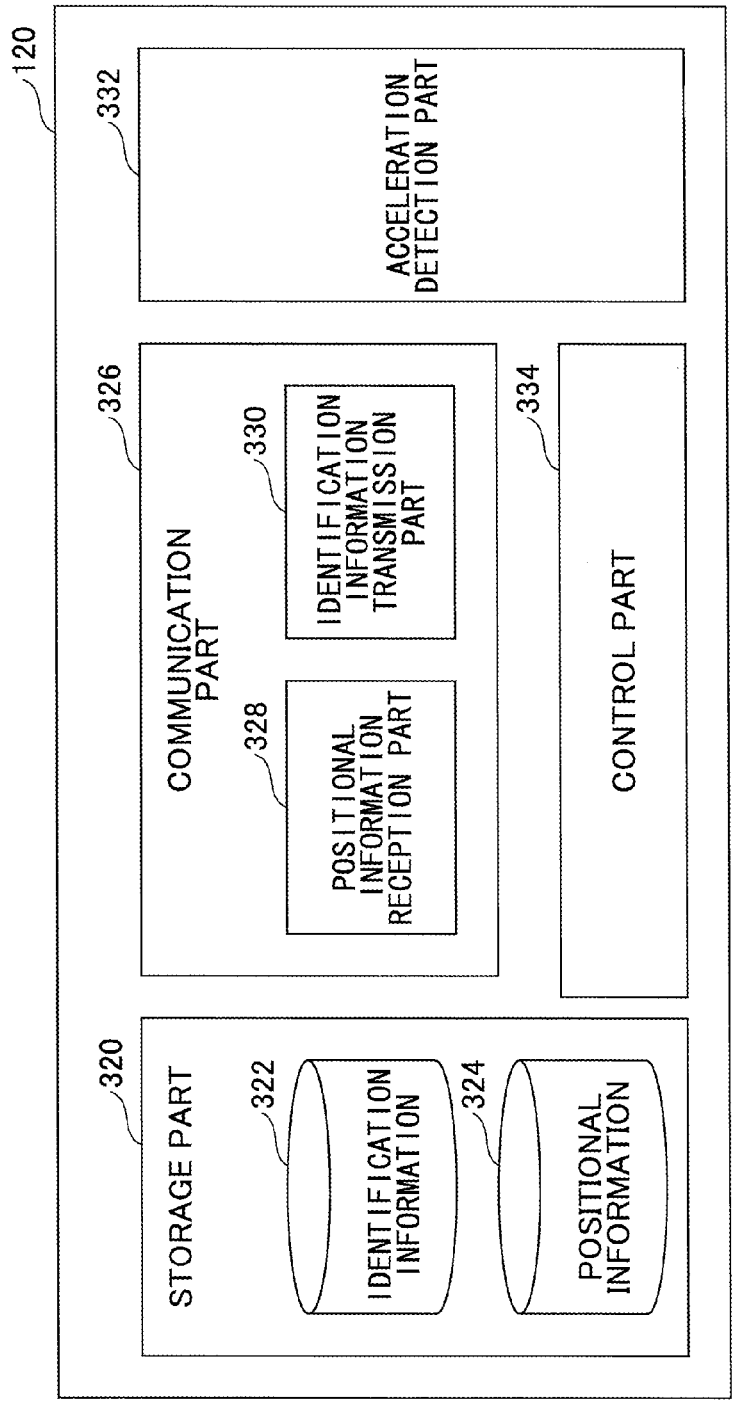
FIG. 15 is a functional block diagram of the wireless terminal according to the second embodiment.

Further, FIG. 10 is a general block diagram of a driving circuit of the light device 150 according to the second embodiment. As shown in FIG. 15, the driving circuit of the light device 150 includes a first power input part 290, a second power input part 294 and a driving part 298.

The first power input part 290 is connected to the connection terminal 153, and the power is supplied via a ballast 175 from the power supply terminal 132 of the first socket 131 of the lighting fixture body 130, and supplies direct-current power to the driving part 298 after removing noise from the power, smoothing and converting the power into the direct-current power. The second power input part 294 is connected to the connection terminal 155, and the power is supplied via the ballast 175 from the power supply terminal 134 of the second socket 133 of the lighting fixture body 130, and supplies direct-current power to the driving part 298 after removing noise from the power, smoothing and converting the power into the direct-current power. In the light device 150, the power can be supplied by any one of the first power input part 290 and the second power input part 294, and also, the power can be supplied thereto by both of the first power input part 290 and the second power input part 294 simultaneously.

It is noted that, for example, the ballast 175 shown in FIG. 10 is included in the power supply part 218 of the lighting fixture body 130 (see FIG. 9) or is provided in the lighting fixture body 130 between the power supply part 218 and the power output end of the lighting fixture body 130.

Further, the driving circuit shown in FIG. (including the first and second power input parts 290, 294 and the driving part 298) corresponds to, for example, the power control part 216 of the light device 150 (see FIG. 9). In this case, the power is supplied to the voltage conversion part 214 of the light device 150 from, for example, any one or both of the first and second power input parts 290, 294 of the driving circuit shown in FIG. 10.

The first power input part 290 and the second power input part 294 have protection parts 291 and 295, noise removal parts 292 and 296, and smoothing parts 293 and 297, respectively. The protection parts 291 and 295 protect the driving part 298 and the light emitting part 215 by preventing abnormal power from being input. The noise removal parts 292 and 296 remove externally introduced surge and noise from the supplied power and then output the power. The smoothing parts 293 and 297 smooth the power input from the noise removal parts 232 and 296, convert the power into the direct-current power, and supply the power to the driving part 298.

The driving part 298 increases or reduces the voltage of the power output by the smoothing parts 293 and 297, and constantly supplies the current having the fixed magnitude to the light emitting part 215.

By the above-mentioned configuration as an example, in the light device 150, no power flows out from the other connection terminal even when the power is input from either one of the connection terminals 153 and 155. Thus, it is possible to prevent an electrical accident which could otherwise occur due to contact, and therefore, safely install the light device 150 without the need of special power supply installation work. Further, it is possible to provide a stable lighting function by protecting the light emitting part 215 by cutting off the noise and so forth from the input power.

Figure 11:
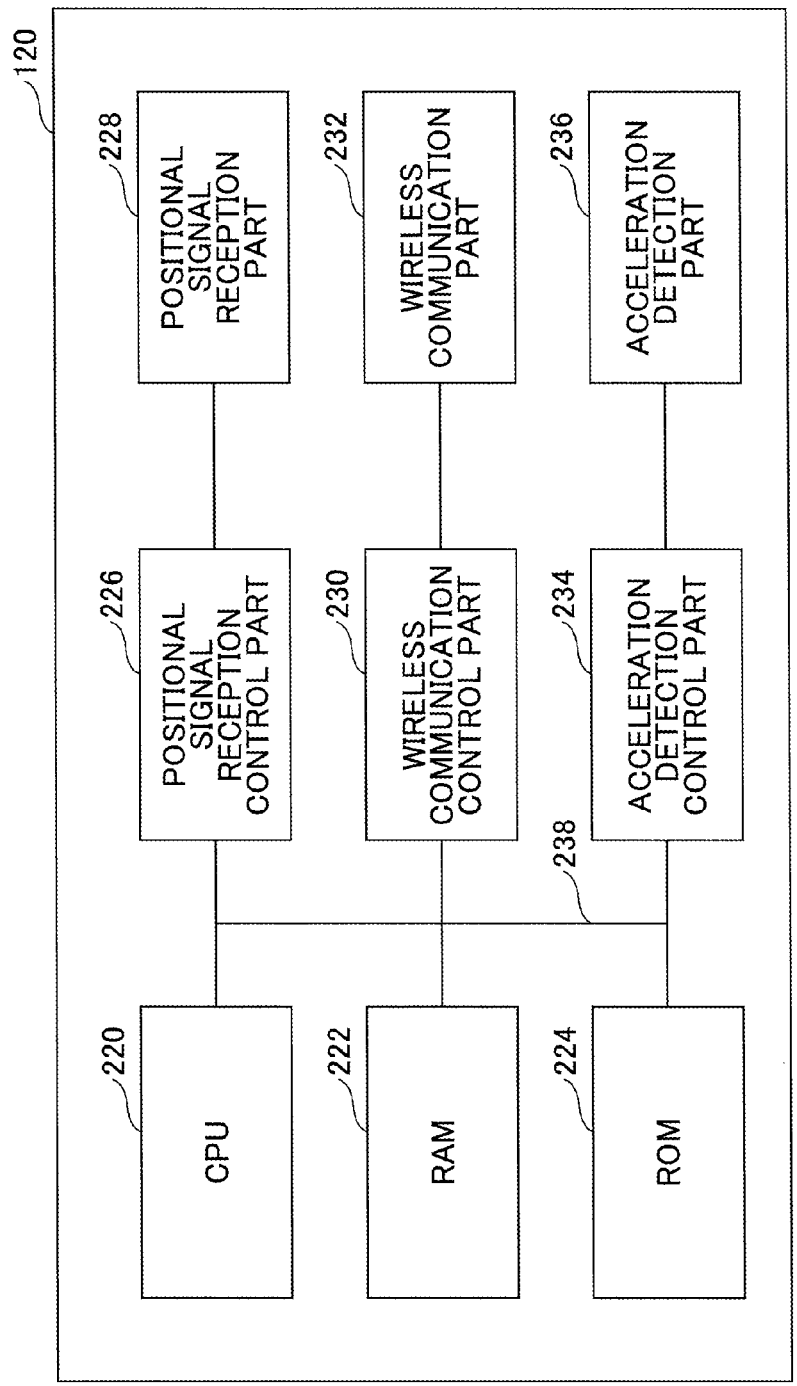
FIG. 11 is a hardware configuration diagram of a wireless terminal according to the second embodiment.

FIG. 11 shows a hardware configuration of the wireless terminal 120 according to the second embodiment, as a typical example of the wireless terminals 120, 122 and 124. Each of the other wireless terminals 122 and 124 has generally the same hardware configuration as the wireless terminal 120. The wireless terminal 120 includes, as shown, a CPU 220, a RAM 222, a ROM 224, a positional signal reception control part 226, a positional signal reception part 228, a wireless communication control part 230, a wireless communication part 232, an acceleration detection control part 234, an acceleration detection part 236 and a bus 238.

The CPU 220 executes a program prepared for carrying out control of the operations of the wireless terminal 120. The RAM 222 provides a work area for the CPU 220, or the like, and stores the positional information received from the lighting fixture 100. The ROM 224 stores the program that the CPU 220 executes and the identification information of the wireless terminal 120. The positional signal reception control part 226 carries out a process for receiving the positioning signal (positional signal) indicating the positional information of the lighting fixture 100 via the positional signal reception part 228. The positional signal reception part 228 is a device including an antenna for receiving the positioning signal such as an IMES signal (positional signal). The wireless communication control part 230 carries out a wireless communication process using the wireless communication part 232. The wireless communication part 232 is a device including an antenna capable of transmitting and receiving radio waves that meet IEEE 802.15.4 standard, for example. The acceleration detection control part 234 detects a change in the acceleration of the wireless terminal 120 via the acceleration detection part 236. The acceleration detection part 236 includes, for example, the acceleration sensor or a motion sensor that uses inertial force or magnetism. The bus 238 electrically connects these respective parts.

By the above-mentioned configuration, the wireless terminal 120 according to the second embodiment can receive the positional information from the lighting fixture 100 and transmit its own identification information together with the positional information to the lighting fixture 100. Especially, by carrying out the operation of receiving or transmitting in timing when the wireless terminal 120 is moved, it is possible to efficiently transmit the identification information and the positional information.

It is noted that in a case where the wireless terminal 120 is an information terminal such as a smartphone, a PC or the like, an input device such as a touch panel, a dial pad, a keyboard, a mouse and/or the like and a corresponding input control part for receiving the user's input may be provided. Further, a display device such as a display screen and a corresponding display control part may be provided.

Further, in a case where the wireless terminal 120 has a GPS antenna and a corresponding control part, the wireless terminal 120 can receive the positioning signal of IMES using the antenna. Thus, it is possible to adapt the wireless terminal 120 for the positional information management system 1' only by modifying the software.

Further, the acceleration detection control part 234 and the acceleration detection part 236 are optional parts. In a case where the acceleration detection control part 234 and the acceleration detection part 236 are not provided, the operation of receiving or transmitting of the wireless terminal 120 is carried out at predetermined time intervals or at a predetermined time of day.

Further, in a case where, as mentioned above, the positional information is received using the wireless communication control part 230 and the wireless communication part 232, the positional signal reception control part 226 and the positional signal reception part 228 become unnecessary.

Figure 12:
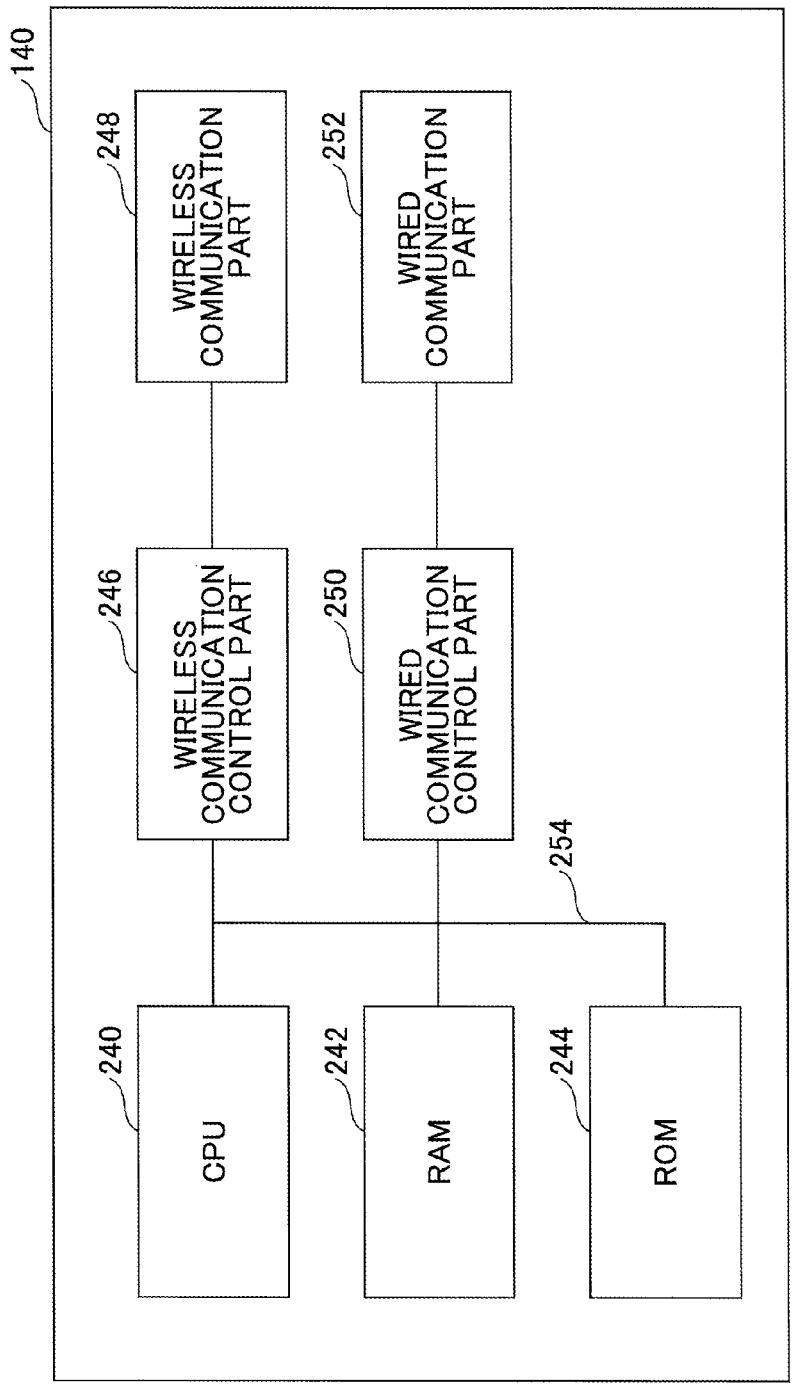
FIG. 12 is a hardware configuration diagram of a management apparatus according to the second embodiment.

FIG. 12 shows a hardware configuration of the management apparatus 140 according to the second embodiment. The management apparatus 140 includes a CPU 240, a RAM 242, a ROM 244, a wireless communication control part 246, a wireless communication part 248, a wired communication control part 250, a wired communication part 252 and a bus 254.

The CPU 240 executes a program prepared for carrying out control of the operations of the management apparatus 140. The RAM 242 provides a work area for the CPU 240, or the like. The ROM 244 stores the program that the CPU 240 executes and data that the CPU 240 uses when executing the program. The wireless communication control part 246 carries out a wireless communication process using the wireless communication part 248. The wireless communication part 248 is a device including an antenna capable of transmitting and receiving radio waves that meet IEEE 802.15.4 standard, for example. The wired communication control part 250 carries out a wired communication process using the wired communication part 252. The wired communication part 252 is a device having a network interface that meets IEEE 802.3 standard, for example. The bus 254 electrically connects these respective parts.

By the above-mentioned configuration, the management apparatus 140 can convert the signals received from the network 180 including the lighting fixtures 100, 102, 104 and 106 and the wireless terminals 120, 122 and 124 to the signals for the network 190 including the management server 160. Further, in a case where the network 180 forming the PAN meets ZigBee (registered trademark), the management apparatus 140 can have the coordinator function for managing the devices participating in the PAN.

Figure 13:
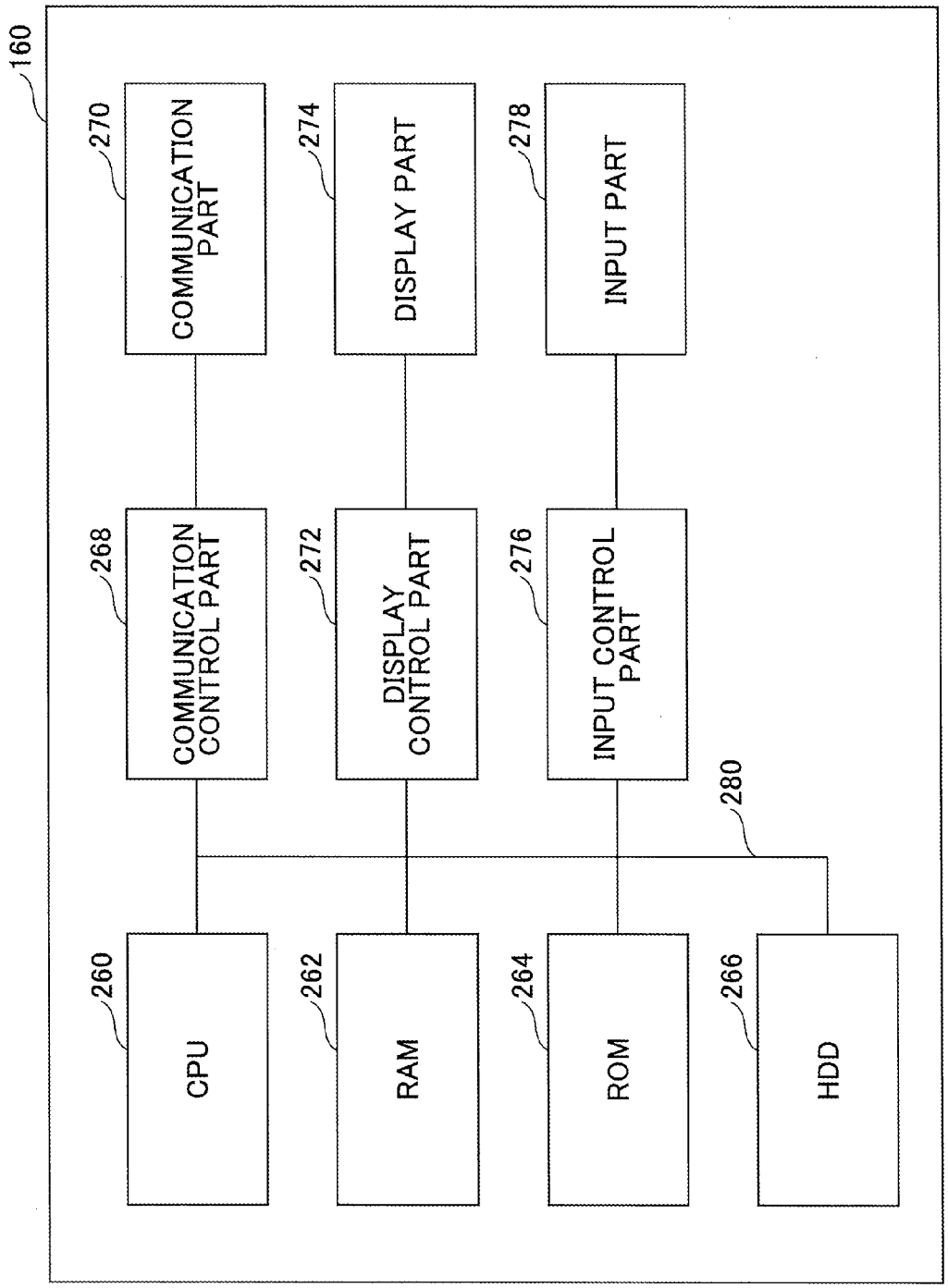
FIG. 13 is a hardware configuration diagram of a management server according to the second embodiment.

FIG. 13 shows a hardware configuration of the management server 160 according to the second embodiment. The management server 160 includes a CPU 260, a RAM 262, a ROM 264, a HDD 266, a communication control part 268, a communication part 270, a display control part 272, a display part 274, an input control part 276, an input part 278 and a bus 280.

The CPU 260 executes a program prepared for carrying out control of the operations of the management server 160. The RAM 262 provides a work area for the CPU 260, or the like. The ROM 264 stores the program that the CPU 260 executes and data that the CPU 260 uses when executing the program. The HDD 266 stores information to be used for managing the positions of the wireless terminals 120, 122 and 124 used in the positional information management system 1'. The communication control part 268 carries out a communication process using the communication part 270. The communication part 270 is a device having a network interface that meets IEEE 802.3 standard, for example. The display control part 272 controls the contents to be displayed on the display part 274 according to the contents obtained from the process carried out by the CPU 260 that executes the program concerning the position management to be carried out by the management server 160. The display part 274 includes a display device such as a liquid crystal display device, a CRT display device or the like. The input control part 276 processes the signal given by the input part 278 such as a keyboard, a mouse and/or the like for receiving the user's input. The bus 280 electrically connects these respective parts.

By the above-mentioned configuration, the management server 160 according to the second embodiment can manage the locations (whereabouts) of the wireless terminals 120, 122 and 124 and search for the locations (whereabouts) of the wireless terminals 120, 122 and 124.

It is noted that the HDD 266 may be changed into any other type of storage device such as a tape drive, or a storage area accessible using a network.

Further, the management server 160 may include the wireless communication control part 246 and the wireless communication part 248 of the management apparatus 140, and carry out the processes of the wireless communication control part 246 and the wireless communication part 248, instead of the management apparatus 140. Thereby, it becomes unnecessary to separately provide the management apparatus 140.

(3. Function)

Figure 14:
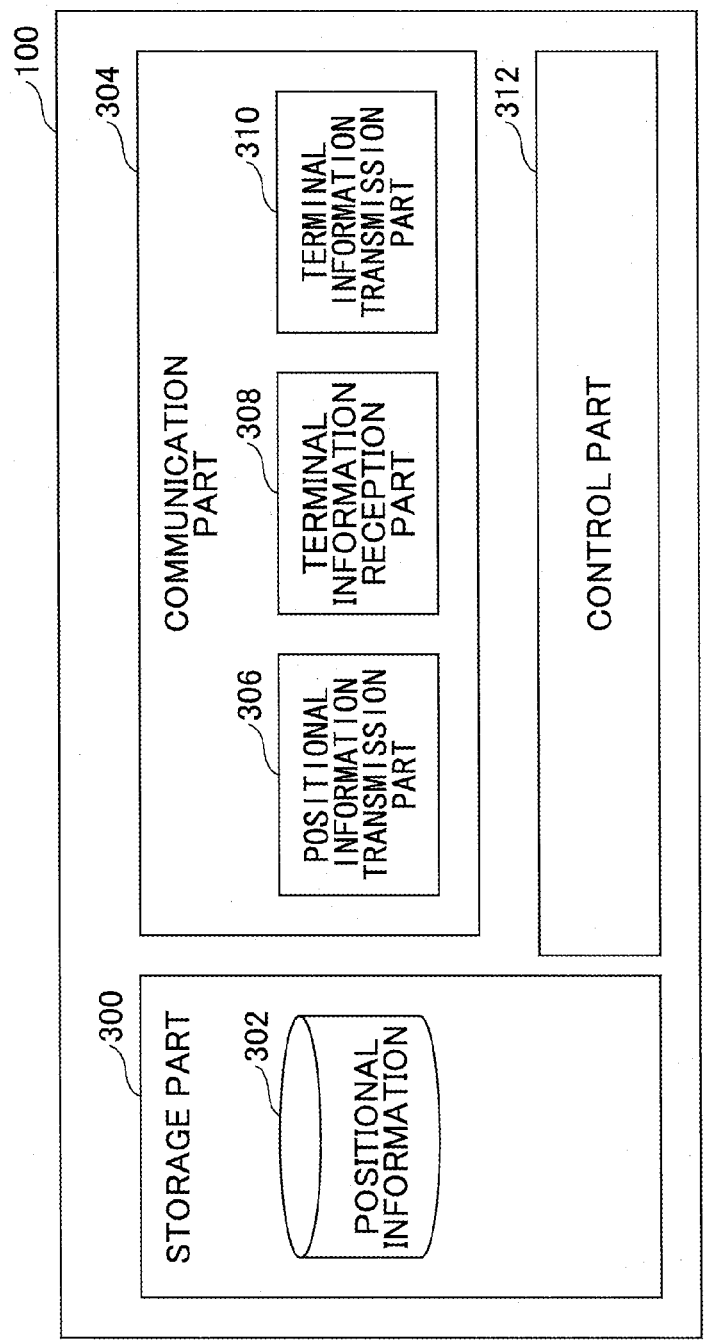
FIG. 14 is a functional block diagram of the lighting fixture according to the second embodiment.

FIG. 14 is a functional block diagram of the lighting fixture 100 according to the second embodiment, as a typical example of the lighting fixtures 100, 102, 104 and 106. Each of the other lighting fixtures 102, 104 and 106 has generally the same functional block configuration as the lighting fixture 100.

The light device 150 of the lighting fixture 100 includes a storage part 300, a communication part 304 and a control part 312.

The storage part 300 stores the positional information 302 of the light device 150. FIG. 18 shows one example of a table for storing the positional information 302. The table of FIG. 18 includes the respective items of "floor number", "latitude", "longitude" and "building number". The floor number denotes the floor number of the floor of the building on which the light device 150 (lighting fixture 100) is installed. The latitude and longitude denote the latitude and longitude of the position at which the light device 150 is placed. The building number denotes the number of the building in which the light device 150 is installed. According to the example of FIG. 18, the light device 150 is placed on the sixteenth floor of one of certain buildings having the number "C", at the place of latitude "35.459555 and longitude "139.387110".

The communication part 304 includes a positional information transmission part 306, a terminal information reception part 308 and a terminal information transmission part 310.

The positional information transmission part 306 continuously or intermittently transmits, in a wireless manner, the positional information 302 including information such as the latitude and longitude information, the floor number of the building and the building number, to the wireless terminal 120 that exists within the predetermined area. The positional information 302 is thus transmitted using a format prescribed in IMES, for example. The positional information transmission part 306 is, for example, the above-mentioned positional signal transmitter 158 that the light device 150 has.

The terminal information reception part 308 receives the identification information and the positional information transmitted by the wireless terminal 120. The terminal information transmission part 310 then transmits the identification information and the position information transmitted by the wireless terminal 120 to the management server 160 via the management apparatus 140. In a case where the network 180 meets ZigBee (registered trademark) standard, the transmitting is carried out using the routing information that the light device 150 has. The terminal information reception part 308 and the terminal information transmission part 310 are, for example, the above-mentioned wireless communication device 159 that the light device 150 has.

The control part 312 controls the operations of the light device 150 of the lighting fixture 100. In a case where the light device 150 forms the PAN that meets the ZigBee (registered trademark) standard together with the light devices 150 of the other lighting fixtures 102, 104 and 106 and the wireless terminals 120, 122 and 124 and the management apparatus 140, the control part 312 carries out the control such that the light device 150 has the router function.

By the above-mentioned configuration, the lighting fixture 100 according to the second embodiment can have the positional information 302, transmit the positional information 302 to the wireless terminal 120, receive the identification information of the wireless terminal 120 and the positional information, and transmit the identification information and the positional information to the management server 160 via the management apparatus 140.

It is noted that the positional information 302 includes at least one of the latitude and longitude information of the light device 150; the floor information of the floor of the building on which the light device 150 is installed; and the building information of the building in which the light device 150 is installed. The positional information 302 may include, as the building information, additional information such as the name of the building in which the light device 150 is installed, information indicating one of divisions inside the room in which the light device 150 is installed, and/or the like. Thereby, it is possible to carry out more refined position management.

FIG. 15 is a functional block diagram of the wireless terminal 120, as a typical example of the wireless terminals 120, 122 and 124 according to the second embodiment. Each of the other wireless terminals 122 and 124 has generally the same functional block configuration as the wireless terminal 120. The wireless terminal 120 according to the second embodiment includes a storage part 320, a communication part 326, an acceleration detection part 332 and a control part 334.

The storage part 320 includes the identification information 322 and the positional information 324. The identification information 322 includes information such as the network address of the wireless terminal 120 by which it is possible to identify the wireless terminal 120 in the positional information management system 1'. For example, in a case where the network 180 meets the IEEE 802.15.4 and ZigBee (registered trademark) standards, it is possible to use the short address as specified in IEEE 802.15.4 or IEEE extended (MAC) address. The positional information 324 is the positional information 302 transmitted by the lighting fixture 100. FIG. 19 shows one example of a table for storing the positional information 324. The configuration of the table of FIG. 19 is the same as FIG. 18.

The communication part 326 includes a positional information reception part 328 and an identification information transmission part 330.

The positional information reception part 328 receives the positional information 302 transmitted by the lighting fixture 100. The received positional information 302 is stored in the storage part 320 of the wireless terminal 120 as the positional information 324.

The identification information transmission part 330 transmits the identification information 322 of the wireless terminal 120 itself and the positional information 324 together to the lighting fixture 100. The positional information 324 is transmitted to the lighting fixture 100 using a format as shown in FIG. 20, for example. According to the format of FIG. 20, the respective fields of the floor number, the latitude, the longitude and the building number are expressed by 9 bits, 21 bits, 21 bits and 8 bits, respectively, and the format is such that the corresponding fields of the message received according to the IMES standard are connected together. The expression format in each field meets the IMES standard. Actually, in addition to the format of FIG. 20, a header and/or checksum information prescribed by the applied communication system are added, and then, the positional information 324 is transmitted. As the communication system, the IEEE 802.15.4 and ZigBee (registered trademark) standards are used, for example.

The acceleration detection part 332 detects a change in the acceleration of the wireless terminal 120. A change in the acceleration is thus detected, for example, at a time the wireless terminal 120 starts moving, at a time the wireless terminal 120 stops the moving, at a time an inclination of the wireless terminal 120 has been detected, and so forth.

For example, at a time when the wireless terminal 120 starts moving, the wireless terminal 120 is accelerated, and thus, the acceleration of the wireless terminal 120 is changed from zero to a positive value or from a positive value to zero accordingly. The acceleration detection part 332 detects such a change in the acceleration, and thus, determines that the wireless terminal 120 has started moving.

A change in the acceleration thus detected is used to determine timing of the operation of transmitting or receiving by the wireless terminal 120. It is noted that the acceleration detection part 332 is an optional part.

The control part 334 controls the timing of receiving the positional information by the positional information reception part 328, and the timing of transmitting the identification information 322 and the positional information 324 by the identification information transmission part 330. These timings of receiving and transmitting are determined based on the detection of a change of the acceleration of the wireless terminal 120 by the acceleration detection part 332. Alternatively, the timings of receiving and transmitting may be determined based on predetermined time intervals or a predetermined time of day, each of which is previously set in the wireless terminal 120. Further, the respective timings of receiving and transmitting may be determined separately. Further, in a case where the wireless terminal 120 forms the PAN that meets the ZigBee (registered trademark) standard together with the other wireless terminals 122 and 124 and the lighting fixtures 100, 102, 104 and 106 and the management apparatus 140, the control part 334 carries out control such that the wireless terminal 120 has the end device function.

By the above-mentioned configuration, the wireless terminal 120 according to the second embodiment can efficiently receive the positional information from the lighting fixture 100 and efficiently transmit the identification information together with the positional information to the lighting fixture 100.

It is noted that in a case where the wireless terminal 120 is an information terminal such as a smartphone or a PC, the wireless terminal 120 may include an input part for receiving the user's input and/or a display part for showing information to the user. Thereby, the wireless terminal 120 can show the identification information or the positional information to the user, or can receive an input or a change of the identification information or the positional information from the user.

Figure 16:
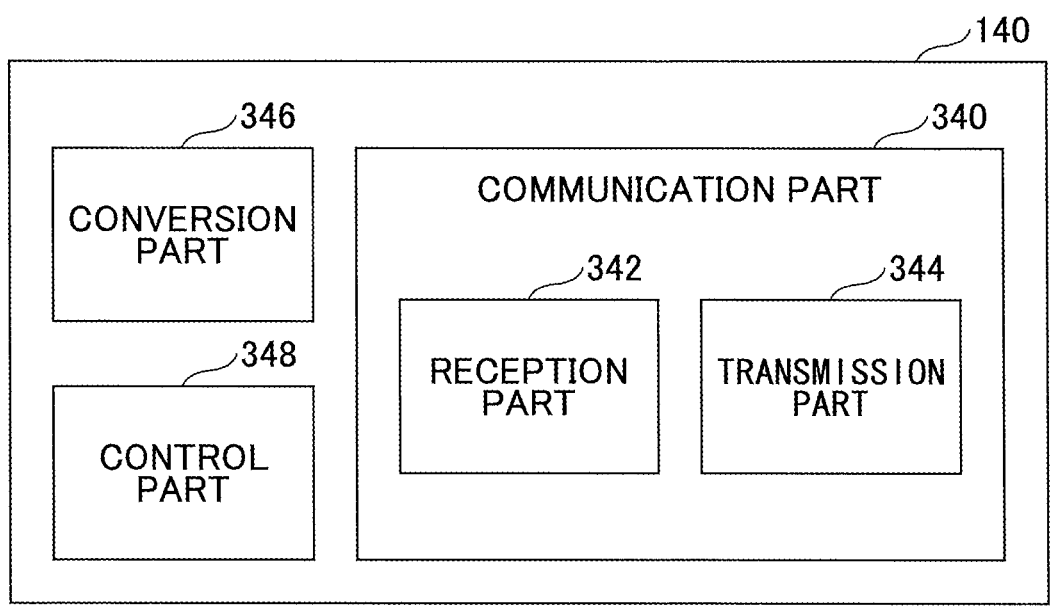
FIG. 16 is a functional block diagram of the management apparatus according to the second embodiment.

FIG. 16 is a functional block diagram of the management apparatus 140 according to the second embodiment. The management apparatus 140 according to the second embodiment includes a communication part 340, a conversion part 346 and a control part 348.

The communication part 340 includes a reception part 342 and a transmission part 344. The reception part 342 receives the data transmitted by the lighting fixtures 100, 102, 104 and 106 or the wireless terminals 120, 122 and 124, which belong to the network 180. The transmission part 344 transmits the data, which has been converted in the management apparatus 140, to the management server 160 that belongs the network 190. The network 180 is, for example, the PAN that meets IEEE 802.15.4 and ZigBee (registered trademark) standards. The network 190 is, for example, the LAN that meets IEEE 802.3 standard.

The conversion part 346 converts the data received from the network 180 by the reception part 342 into a form suitable for the network 190. The data obtained from the conversion is then transmitted to the management server 160 via the network 190 by the transmission part 344. In a case where the identification information of the wireless terminal 120, 122 or 126 included in the data is expressed by the short address as specified in IEEE 802.15.4, the identification information is converted into the IEEE extended address based on the information used at the time of the configuring the PAN.

The control part 348 controls the operations of the management apparatus 140. In a case where the management apparatus 140 forms the PAN that meets the ZigBee (registered trademark) standard together with the lighting fixtures 100, 102, 104 and 106 and the wireless terminals 120, 122 and 124, the control part 348 carries out control such that the management apparatus 140 has the coordinator function.

By the above-mentioned configuration, the management apparatus 140 according to the second embodiment can bridge between the network 180 to which the lighting fixtures 100, 102, 104 and 106 and the wireless terminals 120, 122 and 124 belong and the network 190 to which the management server 160 belongs, for making it possible to carry out communication therebetween.

Figure 17:
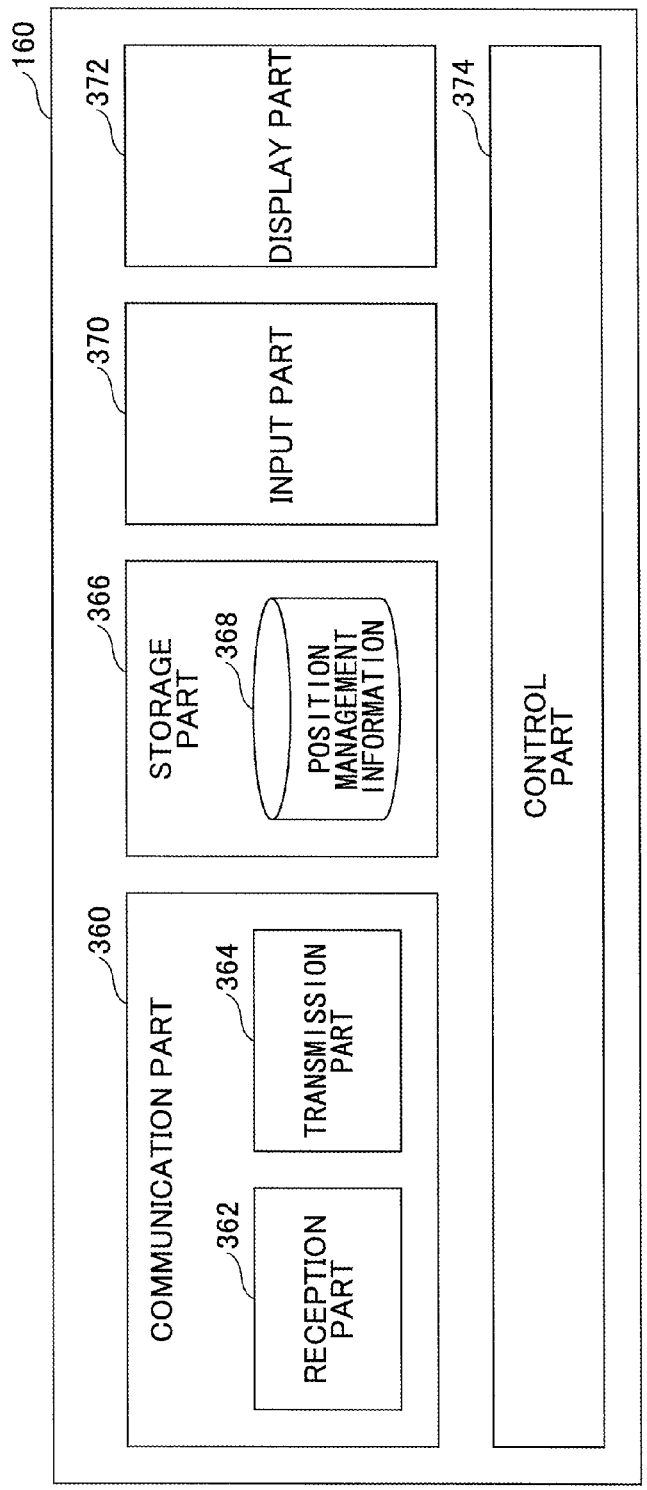
FIG. 17 is a functional block diagram of the management server according to the second embodiment.

FIG. 17 is a functional block diagram of the management server 160 according to the second embodiment. The management server 160 according to the second embodiment includes a communication part 360, a storage part 366, an input part 370, a display part 372 and a control part 374.

The communication part 360 includes a reception part 362 and a transmission part 364. The reception part 362 receives the identification information and the positional information transmitted from the wireless terminals 120, 122 and 124 via the management apparatus 140. The identification information and the positional information thus received are stored in the storage part 366. The transmission part 364 transmits the corresponding positional information to an external server or the like in a case where the positional information is requested by the external server or the like.

The storage part 366 has position management information 368. The position management information 368 is information obtained from adding management information such as the received date and time to the identification information and the positional information received from the wireless terminals 120, 122 and 124. FIG. 21 shows one example of a table for storing the position management information 368.

The table of FIG. 21 has items of "identification information", "latitude", "longitude", "floor number", "building", "received date and time", "apparatus name" and "department". The item "identification information" is an item for the identification information such as the IEEE extended address of the wireless terminal 120, 122 or 124, which has transmitted the identification information. The items "latitude", "longitude", "floor number" and "building" ("building number") are items for those corresponding to the positional information received together with the identification information. The item "received date and time" is an item for information indicating the date and time at which the management server 160 has received the information. The item "apparatus name" is an item for information indicating the name of the management target to which the wireless terminal 120, 122 or 124, which has transmitted the information, is attached, or the apparatus name of the wireless terminal 120, 122 or 124, which has transmitted the information, itself. The item "department" is an item for information indicating the name of the department that has the wireless terminal 120, 122 or 124, which has transmitted the information. The information "apparatus name" and the information "department" are previously associated with the corresponding identification information by the management server 160.

The input part 370 receives the user's input so that the user can obtain the positional information (search for the position).

Figure 24:
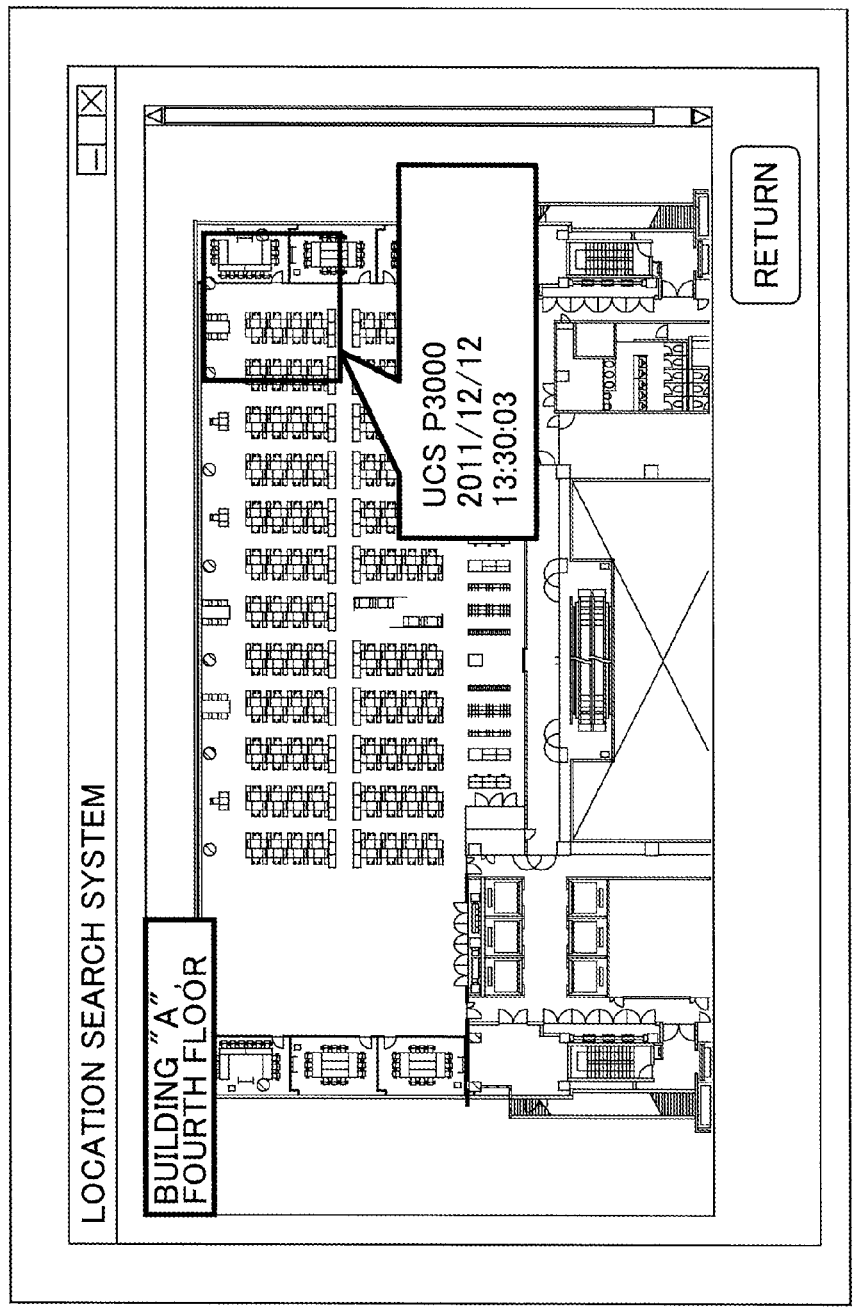
FIG. 24 shows an example of a search result screen page of the management server according to the second embodiment.

The display part 372 displays a GUI of a search screen page for the user to search for the position (obtain the positional information) on the display screen. FIG. 23 shows one example of the search screen page. According to a "location search system" shown in FIG. 23, a list of "departments" and "apparatus names" concerning the wireless terminals is displayed based on the information stored in the storage part 366. Then, when the user selects the check box of the apparatus to be searched for using the input part 370, a check mark is generated at the selected check box, as shown in FIG. 23. FIG. 23 shows one example in which the user wishes to carry out a search for the apparatus having the apparatus name "UCS P3000" that the "Sales Dept. 1" has. When the user presses a "search execution" button on the search screen page of FIG. 23 after the user has selected all the apparatuses to be searched for and the check marks have been generated at the corresponding check boxes accordingly, the corresponding search is carried out by the management server 160, and the search screen page is switched into a screen page showing a search result. FIG. 24 shows one example of the screen page of a search result. That is, when the "search execution" button has been pressed as mentioned above, the display part 372 displays the floor diagram of "building "A", fourth floor" on which "UCS P3000" is placed, the apparatus name "UCS P3000" and the received date and time "2011/12/12 13:30:03", as shown in FIG. 24, based on the information stored in the storage part 366 (see FIG. 21).

The control part 374 controls the operations of the management server 160.

By the above-mentioned configuration, the management server 160 according to the second embodiment can manage the positions of the wireless terminals 120, 122 and 124, and search for the locations (whereabouts) thereof. Especially, the management server 160 can directly receive and manage the information itself which indicates the positions themselves of the wireless terminals 120, 122 and 124. Thus, it is possible to reduce the calculation amount required for searching for the positions.

It is noted that the management server 160 may have the same functions as those of the conversion part 346, the control part 348 and the reception part 342 that the management apparatus 140 has, and thus, have the same functions as those of the management apparatus 140. Thereby, it becomes unnecessary to separately provide the management apparatus 140.

Further, the position management information 368 stored by the management server 160 may include, in addition to the information shown in FIG. 21 or instead thereof, information that includes the date and time at which the wireless terminal 120, 122 or 124 has transmitted the information, the identifier of the light device 150 or the management apparatus 140 by which the information has been relayed, and/or the time period(s) or the transmission electric field strength(s) at the wireless terminal 120, 122 or 124 and/or the light device 150 required until the information has arrived at the management server 160. Thereby, it is possible to manage the positional information under the more detailed conditions.

Further, the management server 160 may store the past positional information of the wireless terminals 120, 122 and 124. Thereby, it is possible to track the movements of the wireless terminals 120, 122 and 124.

(4. Operational Sequence)

Figure 22:
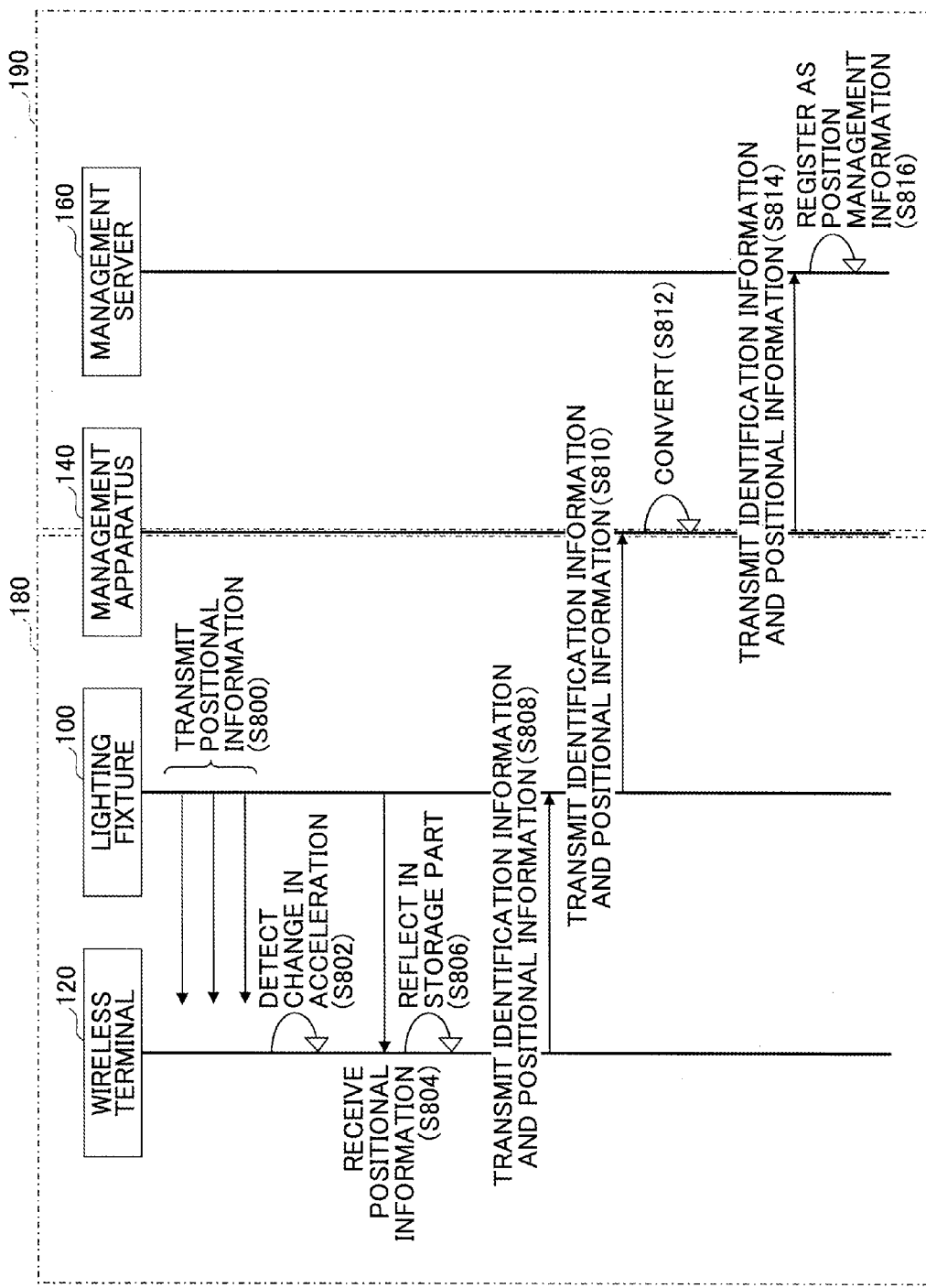
FIG. 22 shows an operational sequence of the positional information management system according to the second embodiment.

FIG. 22 shows an operational sequence of the positional information management system 1' according to the second embodiment shown in FIG. 2. Using FIG. 22, an example will be described in which the positional information management system 1' includes the wireless terminal 120 that receives the positional information when having detected a change in the acceleration of the wireless terminal 120, and transmits the identification information; the lighting fixture 100 that transmits the positional information to the zone to which the wireless terminal 120 belongs; the management apparatus 140 that bridges between the PAN (IEEE 802.15.4 and ZigBee (registered trademark)) and the LAN (IEEE 802.3); and the management server 160. Further, it is assumed that the PAN between the lighting fixture 100, the wireless terminal 120 and the management apparatus 140 has already been configured.

In step S800, the lighting fixture 100 continuously or intermittently transmits the positional information using IMES or the like.

In step S802, the wireless terminal 120 detects a change in the acceleration of the wireless terminal 120.

In step S804, the wireless terminal 120 receives the positional information transmitted by the lighting fixture 100.

In step S806, the wireless terminal 120 stores the received positional information.

In step S808, the wireless terminal 120 transmits the identification information and the positional information to the lighting fixture 100.

In step S810, the lighting fixture 100 transmits the identification information and the positional information, received from the wireless terminal 120, to the management apparatus 140 via the minimum path (route).

In step S812, the management apparatus 140 converts the data transmitted from the network 180, including the identification information and the positional information received from the lighting fixture 100, into a form suitable for the network 190.

In step S814, the management apparatus 140 transmits the identification information and the positional information, converted into the form suitable for the network 190, to the management server 160.

In step S816, the management server 160 registers the identification information and the positional information received from the management apparatus 140 together with the information of the wireless terminal 120 corresponding to the identification information.

By this procedure, in the positional information management system 1', the wireless terminal 120 efficiently transmits the identification information and the positional information to the nearest lighting fixture 100, and thus, it is possible to reduce the power consumption of the wireless terminal 120.

It is noted that, as described above, it is possible to integrate the functions of the management apparatus 140 into the management server 160 so that the management server 160 also carries out the functions of the management apparatus 140. In this case, it becomes unnecessary to install the separate management apparatus 140.

Further, in a case where the wireless terminal 120 does not have the acceleration detection part 332, step S802 is not carried out, and the receiving of the positional information in step S804 can be carried out at a predetermined time of day or at predetermined time intervals. The process thereafter is the same as steps S806 to S816.

In the second embodiment described above, the case has been described where the light devices 150 are used as examples of the electric devices 2 having the delivery devices 3 mentioned above, respectively. The light devices 150 are not limited to the above-mentioned straight-tube-type LED lights, and may be ones having any shapes such as ring shapes, spherical shapes or the like. Further, as the light devices 150, fluorescent lamps or the like of a straight tube type, a ring type, a spherical type or the like may be employed. In any cases, the positional signal transmitter 158 and the wireless communication device 159 are provided at positions not obstructing the light from the light sources in each light device 150.

Further, as mentioned above, the electric devices 2 (see FIG. 1) are not limited to the light devices 150. As the electric devices, it is also possible to use, for example, a ventilating fan(s), a speaker(s), an emergency light(s), a fire alarm(s), a smoke alarm(s), a monitoring camera(s) and/or an air conditioner(s).

According to the embodiments, it is possible to provide the light device with which positional information management can be carried out without hindering the lighting function of the light device.

Although the embodiments of the light device and the positional information management system have been described, the present invention is not limited to the specifically disclosed embodiments, and variations and modifications may be made without departing from the scope of the present invention.

The present application is based on and claims the benefit of priority of Japanese Priority Application No. 2012-133277 filed on Jun. 12, 2012 and Japanese Priority Application No. 2013-081083 filed on Apr. 9, 2013, the entire contents of which are hereby incorporated by reference.

What is claimed is:

1. A light device comprising:
   a light emitting module in which a plurality of light sources are provided;
   caps that are provided at two ends of the light emitting module and are to be mounted in a lighting fixture;
   a positional information transmission part that is provided between an outermost one of the plurality of light sources of the light emitting module and the corresponding cap and transmits predetermined positional information; and
   a wireless communication part that receives identification information of a wireless terminal and the predetermined positional information from the wireless terminal that has received the predetermined positional information.

2. The light device as claimed in claim 1, wherein the positional information transmission part transmits the predetermined positional information using a communication system by which it is possible to carry out indoor positioning.

3. The light device as claimed in claim 1, wherein the predetermined positional information includes at least one of latitude and longitude coordinates of the light device, information of a floor of a building on which the light device is placed, and information of the building in which the light device is placed.

4. The light device as claimed in claim 1, further comprising a positional information transmission module that includes a transmission control part that controls transmission of the predetermined positional information carried out by the positional information transmission part, wherein
the positional information transmission part is provided on the positional information transmission module.

5. The light device as claimed in claim 1, wherein a surface of the positional information transmission part is colored the same color as an emission color of the light sources.

6. The light device as claimed in claim 1, wherein the wireless communication part is provided between an outermost one of the plurality of light sources of the light emitting module and the corresponding cap, and transmits the identification information and the predetermined positional information to a management server that manages a position of the wireless terminal.

7. A positional information management system comprising:
a light device that has predetermined positional information;
a wireless terminal that receives the predetermined positional information from the light device and transmits the predetermined positional information and identification information to the light device; and
a management server that receives the predetermined positional information and the identification information from the light device and manages a position of the wireless terminal, wherein
the light device includes
a light emitting module in which a plurality of light sources are provided;
caps that are provided at two ends of the light emitting module and are to be mounted in a lighting fixture; and
a positional information transmission part that is provided between an outermost one of the plurality of light sources of the light emitting module and the corresponding cap and transmits the predetermined positional information.

8. The positional information management system as claimed in claim 7, wherein the management server manages the predetermined positional information of the light device and the identification information of the wireless terminal to be associated with each other to provide information indicating that the position of the wireless terminal corresponds to a position of the light device.

9. A light device comprising:
a light emitting module in which a plurality of light sources are provided;
caps that are provided at two ends of the light emitting module and are to be mounted in a lighting fixture;
a positional information transmission part that is provided between an outermost one of the plurality of light sources of the light emitting module and the corresponding cap and transmits predetermined positional information;
a transmission module that includes the positional information transmission part, wherein the positional information transmission part is provided at an end surface on a substrate provided integrally with a part of the cover of the light device, and the positional information transmission part is placed in such a position as not to obstruct light irradiated by the plurality of light sources; and
a wireless communication module that includes a wireless communication part, wherein the transmission module and the wireless communication module are provided on a side of the substrate opposite to a side of the substrate on which the plurality of light sources are provided.

* * * * *